(12) United States Patent
Su et al.

(10) Patent No.: US 11,772,262 B2
(45) Date of Patent: Oct. 3, 2023

(54) DETECTING SLIPPAGE FROM ROBOTIC GRASP

(71) Applicant: Dexterity, Inc., Redwood City, CA (US)

(72) Inventors: Harry Zhe Su, Union City, CA (US); Zhouwen Sun, Santa Clara, CA (US); Samir Menon, Palo Alto, CA (US)

(73) Assignee: Dexterity, Inc., Redwood City, CA (US)

( * ) Notice: Subject to any disclaimer, the term of this patent is extended or adjusted under 35 U.S.C. 154(b) by 172 days.

(21) Appl. No.: 17/029,418

(22) Filed: Sep. 23, 2020

(65) Prior Publication Data

US 2021/0122039 A1   Apr. 29, 2021

Related U.S. Application Data

(60) Provisional application No. 62/926,162, filed on Oct. 25, 2019.

(51) Int. Cl.
*B25J 9/16* (2006.01)
*B25J 13/08* (2006.01)

(52) U.S. Cl.
CPC ............ *B25J 9/1612* (2013.01); *B25J 9/163* (2013.01); *B25J 9/1633* (2013.01); *B25J 13/083* (2013.01); *B25J 13/084* (2013.01)

(58) Field of Classification Search
CPC ........ B25J 9/1633; B25J 9/1612; B25J 9/163; B25J 13/084; B25J 13/083; G05B 2219/40567; G05B 2219/39507; G05B 2219/40625

See application file for complete search history.

(56) References Cited

U.S. PATENT DOCUMENTS

| 3,986,007 A | 10/1976 | Ruoff, Jr. |
| 4,605,354 A | 8/1986 | Daly |
| 4,766,389 A | 8/1988 | Rhoades |
| 6,909,084 B2 * | 6/2005 | Tachi ..................... G06F 3/042 250/221 |

(Continued)

FOREIGN PATENT DOCUMENTS

| CN | 107848112 | 8/2021 |
| JP | H09323281 | 12/1997 |

(Continued)

*Primary Examiner* — Khoi H Tran
*Assistant Examiner* — Rodney P King
(74) *Attorney, Agent, or Firm* — Van Pelt, Yi & James LLP

(57) ABSTRACT

A plurality of sensors are configured to provide a corresponding output that reflects a sensed value associated with engagement of a robotic arm end effector with an item. The respective outputs of one or more sensors comprising the plurality of sensors are used to determine one or more inputs to a multi-modal model configured to provide, based at least in part on the one or more inputs, an output associated with slippage of the item within or from a grasp of the robotic arm end effector. A determination associated with slippage of the item within or from the grasp of the robotic arm end effector is made based at least in part on an output of the multi-modal model. A responsive action is taken based at least in part on the determination associated with slippage of the item within or from the grasp of the robotic arm end effector.

19 Claims, 10 Drawing Sheets

(56) References Cited

U.S. PATENT DOCUMENTS

| | | | |
|---|---|---|---|
| 10,286,565 B1 | 5/2019 | Swiercz | |
| 10,576,630 B1 * | 3/2020 | Diankov | B25J 9/1633 |
| 10,576,643 B2 | 3/2020 | Lessing | |
| 10,682,774 B2 * | 6/2020 | Bingham | B25J 13/085 |
| 2003/0178556 A1 | 9/2003 | Tachi | |
| 2008/0245955 A1 | 10/2008 | Tachi | |
| 2012/0174672 A1 | 7/2012 | Tsuruno | |
| 2012/0253512 A1 | 10/2012 | Sato | |
| 2017/0239821 A1 | 8/2017 | Lessing | |
| 2018/0250831 A1 | 9/2018 | Hashimoto | |
| 2018/0264660 A1 | 9/2018 | Bergeron | |
| 2019/0176326 A1 | 6/2019 | Bingham | |
| 2019/0248003 A1 | 8/2019 | Nagarajan | |
| 2020/0019864 A1 * | 1/2020 | Gu | G05B 19/4183 |
| 2020/0094412 A1 | 3/2020 | Casse | |
| 2020/0393313 A1 | 12/2020 | Yu | |
| 2021/0101292 A1 | 4/2021 | Kuppuswamy | |
| 2021/0278300 A1 | 9/2021 | Bao | |
| 2021/0283771 A1 | 9/2021 | Ijiri | |
| 2021/0354316 A1 | 11/2021 | Nabeto | |

FOREIGN PATENT DOCUMENTS

| | | |
|---|---|---|
| JP | 2000263481 | 9/2000 |
| JP | 3412465 | 6/2003 |
| JP | 2005349492 | 12/2005 |
| JP | 2009190111 | 8/2009 |
| JP | 2013086186 | 5/2013 |
| JP | 2015145057 | 8/2015 |
| JP | 2015226956 | 12/2015 |
| JP | 2016203293 | 12/2016 |
| JP | 2019025566 | 2/2019 |
| JP | 2019181622 | 10/2019 |
| WO | 2018235214 | 12/2018 |

* cited by examiner

350 ⬋

Strain Gauge
Top View

352

Side View

352

360 ⬋

Pressure Sensor
Top View

362

Side View

362

DETECTING SLIPPAGE FROM ROBOTIC GRASP

CROSS REFERENCE TO OTHER APPLICATIONS

This application claims priority to U.S. Provisional Patent Application No. 62/926,162 entitled DETECTING SLIPPAGE FROM ROBOTIC GRASP filed Oct. 25, 2019 which is incorporated herein by reference for all purposes.

BACKGROUND OF THE INVENTION

A robotic system may be tasked with picking and placing items from a first location to a second location. The robotic system may use an end effector to grasp an item at the first location. Once the item has been grasped successfully, the robotic system may move the item to the second location. However, the item may slip from a grasp of the end effector while the item is being moved from the first location to the second location. The item may be damaged as a result of being dropped from too great a height.

BRIEF DESCRIPTION OF THE DRAWINGS

Various embodiments of the invention are disclosed in the following detailed description and the accompanying drawings.

DETAILED DESCRIPTION

Figure 1:
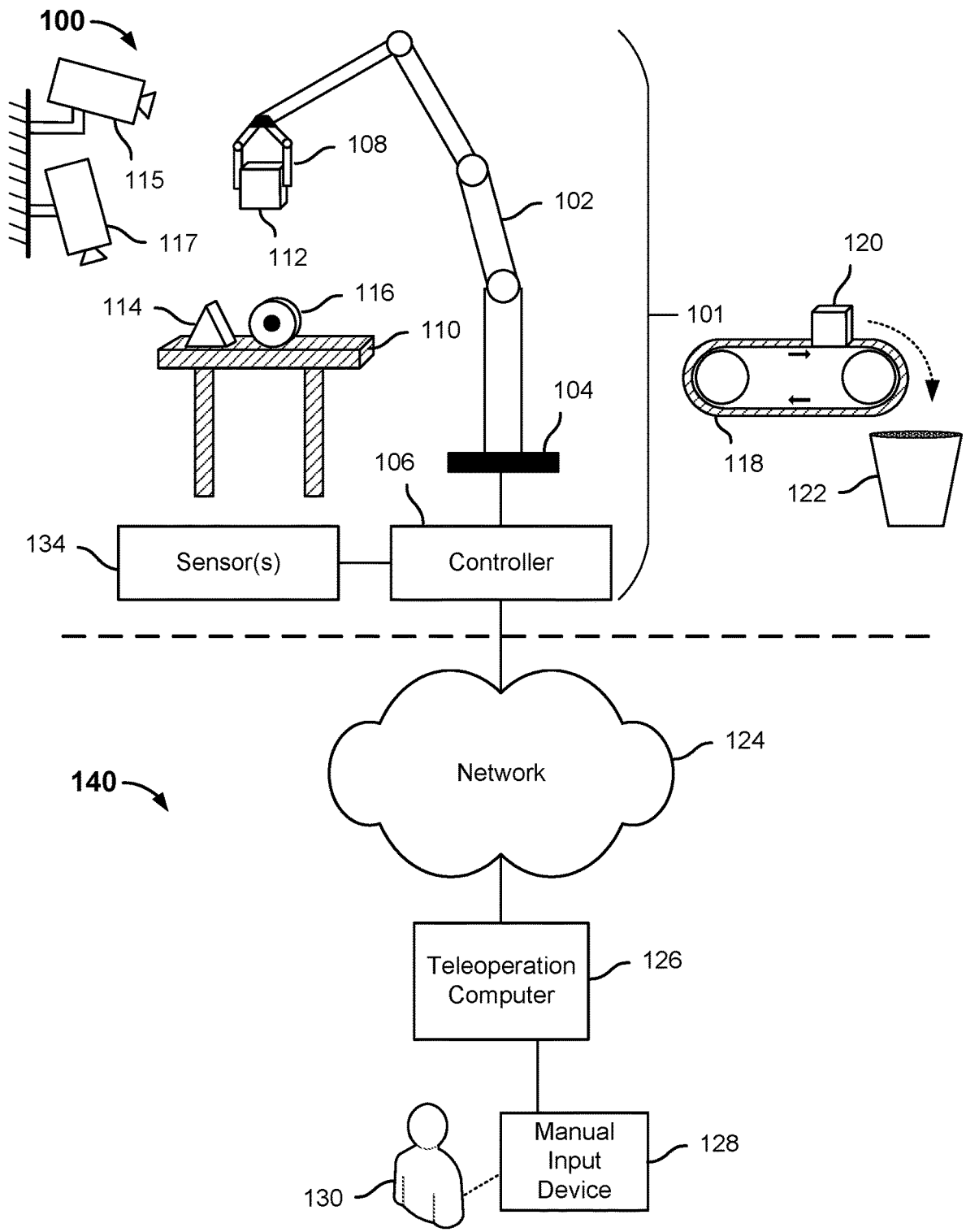
FIG. 1 is a block diagram illustrating a system for picking and placing items in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques are disclosed to determine whether an item is starting to slip or is slipping from a grasp of a robotic arm end effector. In various embodiments, a tactile sensing unit is provided. The tactile sensing unit is used to determine whether an item is starting to slip or is slipping from a grasp of a robotic arm end effector. The tactile sensing unit includes and/or receives sensor output values generated by one or more sensors. The one or more sensors may include one or more of magnetic sensors, optical sensors, electromechanical sensors, pressure sensors, strain gages, force sensors, conductivity sensors, current sensors, voltage sensors, capacitance sensors, resistance sensors, inductance sensors, infrared sensors, temperature sensors, etc.

Each of the one or more sensors is configured to provide an output that reflects a sensed value associated with engagement of the robotic arm end effector with an item (also referred to as an "object"). The one or more sensor outputs are used to determine one or more modalities indicative of engagement of the robotic arm end effector with an item. The one or more modalities may include weight, deformation, continuity, conductivity, pressure, resistance, inductance, capacitance, or any other modality that is indicative of robotic arm end effector engagement.

The tactile sensing unit may be associated with a robotic arm end effector. A robotic arm end effector may include two or more fingers. A corresponding tactile sensing unit may be attached to each of the fingers. The end effector may include one or more suction cups, or other structures to engage an item, and a corresponding tactile sensing unit may be attached to each of the suction cups or other structure used to engage items. In some embodiments, one or more tactile sensing units are included in a sensing covering (e.g., glove, mitten, etc.) that is placed over the fingers of the robotic arm end effector such that each of the fingers has an associated tactile sensing unit. In some embodiments, one or more tactile sensing units are embedded in the robotic arm end effector.

The tactile sensing unit may include a plurality of sensing layers. Each of the sensing layers may include one or more sensors. The tactile sensing unit may include one or more of a conductive layer, a deformation layer, and a substrate layer. When engaged with an item, a sensor of the tactile sensing unit may output a corresponding sensed value that is different from a reference sensed value (e.g., a tare value when the robotic arm end effector is not engaged with an item). A sensed value of the sensor may change in the event an item is starting to slip or is slipping from a grasp of the robotic arm end effector.

The conductive layer may include conductive material (e.g., metal) that enables continuity or other electrical properties, such as conductivity, resistance, capacitance, or inductance, to be measured. The conductive layer may be a top layer of the tactile sensing unit such that when a first tactile sensing unit attached to a first finger of an end effector contacts a second tactile sensing unit attached to a second finger of the end effector, the conductive layers of the first and second tactile sensing units come into contact.

When the robotic arm end effector grasps an item, the item prevents the conductive layers of the tactile sensing units from contacting each other. However, when the robotic arm end effector drops the item, the conductive layers of the tactile sensing units may come into contact with each other. The conductive layer is coupled to a processor that is able to use an output from the conductive layer to determine one or more continuity values, one or more conductivity values, one or more resistance values, one or more capacitance values, and/or one or more inductance values. The processor may monitor the determined values over time while the robotic arm end effector is moving the item from the first location to the second location to determine whether the item is starting to slip and/or is slipping from the robotic arm end effector's grasp.

In some embodiments, the deformation layer includes a dielectric material (e.g., silicon, plastic, or any other material that is capable of being deformed in response to a force). Measurement objects may be injected into the dielectric material. Reference sensed values are determined before the robotic end effector engages an item. When the robotic arm end effector engages an item, the sensed values are compared to the reference sensed values. The sensed values may be different depending upon whether the end effector successfully or unsuccessfully grasped the item and/or whether the item is slipping or about to slip. While the robotic arm end effector is grasping an item, the sensed values may fluctuate. However, as an item is slipping from a grasp of the robotic arm end effector, the sensed values may fluctuate more than a threshold amount or may fluctuate differently than when the item is not slipping. A processor coupled to one or more sensors associated with the deformation layer monitors the sensed values over time while the robotic arm end effector is moving the item from the first location to the second location to determine whether the item is starting to slip and/or is slipping from the grasp of the robotic arm end effector.

In some embodiments, a plurality of magnets are injected into the dielectric material. The plurality of magnets may be arranged in a grid (e.g., 2D grid or 3D grid) or non-grid pattern. One or more magnets may be located on an edge boundary of the dielectric material. The plurality of magnets are associated with a magnetic sensor located on the substrate layer. The magnetic sensor detects a reference magnetic field before the robotic arm end effector engages an item. When the robotic arm end effector engages an item, a force and/or moment associated with the engagement causes one or more of the plurality of magnets to be displaced. This displacement causes a change in magnetic field that is sensed by the magnetic sensor. The magnetic sensor is coupled to a processor, which may use the change in magnetic field to determine a weight value and/or a deformation value.

The magnetic sensor may detect the magnetic field while the robotic arm end effector is moving the item from the first location to the second location to determine whether the item is starting to slip and/or is slipping from the robotic arm end effector's grasp. The processor may monitor the current magnetic field, the current weight value, and the current deformation values for any changes. A change in the current magnetic field from the magnetic field associated with a successful grasp, the current weight value from the weight value associated with a successful grasp, and/or the current deformation value from a deformation value associated with a successful grasp that exceeds a corresponding first threshold may indicate that the item is starting to slip from the robotic arm end effector's grasp. A change in the current magnetic field from the magnetic field associated with a successful grasp, the current weight value from the weight value associated with a successful grasp, and/or the current deformation value from a deformation value associated with a successful grasp that exceeds a corresponding second threshold may indicate that the item is slipping from the robotic arm end effector's grasp.

In some embodiments, a plurality of markers are embedded in the dielectric material. The plurality of markers may be arranged in a grid or non-grid pattern. The grid pattern may be a 2D grid pattern or a 3D grid pattern. The plurality of markers may be associated with an image sensor located on the substrate layer. The image sensor may detect a reference position for all of the markers before the robotic arm end effector engages an item. When the robotic arm end effector engages an item, a force and/or moment associated with the engagement causes one or more of the plurality of markers to be displaced. This displacement causes a change in marker position that is sensed by the image sensor. The image sensor is coupled to a processor, which may use the change in marker position to determine a weight value and/or a deformation value.

The image sensor may detect the position of the markers while the robotic arm end effector is moving the item from the first location to the second location to determine whether the item is starting to slip and/or is slipping from the robotic arm end effector's grasp. The processor may monitor the current positions, the current weight value, and the current deformation values for any changes. A change in the current positions of the markers from the positions associated with a successful grasp, the current weight value from a weight associated with a successful grasp, and/or a current deformation value from a deformation value associated with a successful grasp that exceeds a corresponding first threshold may indicate that the item is starting to slip from the robotic arm end effector's grasp. A change in the current positions of the markers from the positions associated with a successful grasp, the current weight value from a weight associated with a successful grasp, and/or a current deformation value from a deformation value associated with a successful grasp that exceeds a corresponding second threshold may indicate that the item is slipping from the robotic arm end effector's grasp.

In some embodiments, a reflective material is embedded in the dielectric material and an emitter and receiver are located on the substrate layer. The emitter may transmit a signal that is reflected off the reflective material and the reflected signal is received at the receiver. When the robotic arm end effector engages an item, a force and/or moment associated with the engagement changes how the signal travels through the dielectric material. The engagement causes the amplitude of the reflected signal received at the receiver to change from a reference signal amplitude. The receiver is coupled to a processor, which may use the change in signal amplitude to determine a weight value and/or a deformation value.

The receiver may continue to receive a signal while the robotic arm end effector is moving the item from the first location to the second location to determine whether the item is slipping from the robotic arm end effector's grasp. The processor may monitor an amplitude of the received signal, the weight value, and the deformation values for any changes. A change in the current signal amplitude from the signal amplitude associated with a successful grasp, the current weight value from a weight associated with a successful grasp, and/or a current deformation value from a deformation value associated with a successful grasp that exceeds a corresponding first threshold may indicate that the item is starting to slip from the robotic arm end effector's grasp. A change in the current signal amplitude from the signal amplitude associated with a successful grasp, the current weight value from a weight associated with a successful grasp, and/or a current deformation value from a deformation value associated with a successful grasp that exceeds a corresponding second threshold may indicate that the item is slipping from the robotic arm end effector's grasp.

In some embodiments, one or more electro-mechanical sensors capable of detecting deformation (e.g., strain gauge) are embedded in the dielectric material. When the robotic arm end effector engages an item, a force and/or moment associated with the engagement causes a resistance associated with the one or more electro-mechanical sensors to change. The one or more electro-mechanical sensors are coupled to a processor, which may use the change in resistance to determine a weight value and/or a deformation value.

The one or more electrical mechanical sensors output a resistance while the robotic arm end effector is moving the item from the first location to the second location to determine whether the item is slipping from the robotic arm end effector's grasp. The processor may monitor the resistance, the weight value, and the deformation values for any changes. A change in the current resistance value from the resistance value associated with a successful grasp, the current weight value from a weight associated with a successful grasp, and/or a current deformation value from a deformation value associated with a successful grasp that exceeds a corresponding first threshold may indicate that the item is starting to slip from the robotic arm end effector's grasp. A change in the current resistance value from the resistance value associated with a successful grasp, the current weight value from a weight associated with a successful grasp, and/or a current deformation value from a deformation value associated with a successful grasp that exceeds a corresponding second threshold may indicate that the item is slipping from the robotic arm end effector's grasp.

In some embodiments, the dielectric material may include a flexible membrane (e.g., sac, pouch) that contains a gas, air, or a liquid. When the robotic arm end effector engages an item, a force and/or moment associated with the engagement causes a pressure associated with the flexible membrane to change. The pressure may be detected by a pressure sensor and a processor may use the change in pressure to determine a weight value and/or a deformation value.

The processor may monitor the pressure, the weight value, and the deformation values for any changes while the robotic arm end effector is moving the item from the first location to the second location to determine whether the item is slipping from the robotic arm end effector's grasp. A change in the current pressure value from the pressure value associated with a successful grasp, the current weight value from a weight associated with a successful grasp, and/or a current deformation value from a deformation value associated with a successful grasp that exceeds a corresponding first threshold may indicate that the item is starting to slip from the robotic arm end effector's grasp. A change in the current pressure value from the pressure value associated with a successful grasp, the current weight value from a weight associated with a successful grasp, and/or a current deformation value from a deformation value associated with a successful grasp that exceeds a corresponding second threshold may indicate that the item is slipping from the robotic arm end effector's grasp.

The one or more tactile sensing units are coupled to a processor. The robotic arm end effector may include other sensors that are also coupled to the processor. For example, a housing that connects the fingers of the robotic arm end effector to the robotic arm may include one or more sensors that are used to measure force and/or torque. The one or more housing sensors may be used to filter a sensed weight to normalize for the weight of the robotic arm end effector. The sensor output associated with the one or more sensors of the housing may be used to determine one or more modalities. The plurality of sensors (e.g., tactile sensing unit sensor(s) and/or housing sensor(s)) provide their corresponding outputs to the processor. The processor may use the sensor outputs to determine one or more forces and/or one or more moments associated with an engagement between the robotic arm end effector and an item. The processor may use the sensor outputs to determine forces and moments associated with each of the tactile sensing units.

The processor may use the sensor outputs to determine corresponding values for the plurality of modalities. For example, a sensed weight, a sensed amount of deformation, a sensed continuity, a sensed conductivity, a sensed pressure, a sensed resistance, a sensed inductance, and/or a sensed capacitance may be determined. The plurality of modalities are each associated with a coefficient. In some embodiments, the plurality of modalities are weighted equally (e.g., they each have an associated coefficient of "1"). In some embodiments, some of the plurality of modalities have different weights. For example, the item may be a metal item and the coefficient associated with a continuity factor may be less than the coefficient associated with a deformation factor.

The processor may implement a multi-modal model to determine whether an item is starting to slip and/or is slipping from a grasp of the robotic arm end effector. The multi-modal model may be a rule-based model, a predictive model, a machine learning model (e.g., neural network, linear classifier, support vector machine, linear regression, logistic regression, decision tree, deep learning, etc.), etc. In some embodiments, the multi-modal model is configured to output a binary decision regarding whether the item is starting to slip from the grasp of the robotic arm end effector. In some embodiments, the multi-modal model is configured to output a binary decision regarding whether the item is slipping from the grasp of the robotic arm end effector. In some embodiments, the multi-modal model is configured to output a probability of whether the item is starting to slip from a grasp of the robotic arm end effector. In some embodiments, the multi-modal model is configured to output a probability of whether the item is slipping from a grasp of the robotic arm end effector.

The values associated with some or all of the plurality of modalities and their corresponding coefficients are provided as input to the multi-modal model. The input is applied to the multi-modal model and the robotic system is configured to perform a responsive action (e.g., feedback control, reactive motion, etc.) based on an output of the multi-modal model. In some embodiments, the robotic system moves the item from the first location to the second location. In some embodiments, the robotic system applies additional force to grasp the item. In some embodiments, the robotic system sets the item down and re-grasps the item. In some embodiments, the robotic system requests human intervention. In some embodiments, the robotic system adjusts a manner in which the robotic system is grasping the item. For example, the robotic arm may be rotated such that gravity is being applied to the grasped item in a different axis. In some embodiments, the robotic system proactively adjusts the grasp motion to prevent slippage.

Using tactile sensing units and a multi-modal model enables the robotic system to accurately determine whether an item is starting to slip and/or is slipping from a grasp of the robotic arm end effector. The plurality of sensors may provide data points from different points of view that confirm the same conclusion, that is, the robotic arm end effector is starting to slip and/or is slipping from a grasp of the robotic arm end effector. A single factor approach may bias the robotic system in its decision making process. For example, a robotic system may only use continuity between fingers of the robotic arm end effector as a factor. A robotic system may not determine that an item is slipped from a grasp of the robotic arm end effector, but the item may be conductive. Using continuity as the only factor may cause the robotic system to determine that the item is still being grasped by the robotic arm end effector when the item was actually dropped by the robotic arm end effector. In contrast, using multiple modalities provides the robotic system with a balanced approach in its decision making process.

FIG. 1 is a block diagram illustrating a system for picking and placing items in accordance with some embodiments. In the example shown, a robotic system 101 is operating in environment 100. The robotic system 101 includes a plurality of jointed segments comprising a robotic arm 102 mounted on a stationary base 104, an end effector 108, one or more sensors 134, and a controller 106. In some embodiments, stationary base 104 is optional. The robotic arm 102 is coupled to a controller 106 that is configured to manipulate the robotic arm 102 and an end effector 108 mounted on a distal end of robotic arm 102. In some embodiments, controller 106 controls the robotic arm 102 and end effector 108 by providing voltages and/or other signals, inputs, etc. to motors configured at each of the respective joints between rigid elements comprising the robotic arm 102 and/or end effector 108 to cause the respective motors to apply corresponding torque(s) to cause an element coupled to a rotating element of the motor to move relative to an element to which a non-rotating element of the motor is coupled. End effector 108 may include a suction gripper, a parallel gripper, a soft gripper, a dexterous gripper, etc. Robotic system 101 may include a plurality of end effectors and select an end effector that is best suited to grasp the object. For example, an end effector may be selected based on an object's texture. Robotic system 101 may select a parallel gripper instead of a suction gripper in the event the object has too many wrinkled areas.

In the example shown in FIG. 1, the robotic arm 102 is being used to pick up items from a table or other surface 110 (e.g., a workspace area), including in the example shown differently shaped items 112, 114, and 116, and place them on a conveyor belt 118 (e.g., a drop off area). As shown, robotic arm 102 has previously been used to place item 120 on the conveyor belt 118, which is rotating in a direction such that the object 120 is about to fall off the conveyor belt 118 into a destination 122. A workspace area may include a moving platform, such as a conveyor belt or a rotating platform, or a stationary area, in which a pile of items (stable or unstable) are located.

In various embodiments, the "pick and place" operation shown in FIG. 1 is performed by the robotic system 101 comprising robotic arm 102, end effector 108, and controller 106, at least in part in an autonomous mode of operation. For example, in some embodiments the controller 106 and/or one or more other control devices, such as a computer comprising a processor, a memory, and other components, is/are programmed to perform the pick and place operation illustrated in FIG. 1. For example, in some embodiments a programmer or other operator may have programmed or otherwise configured the robotic system 101 to have an awareness of its environment 100 and its position relative to the items on table 110 (or, in some embodiments, a set of coordinates or other locations associate with the table 110, on the one hand, and the conveyor belt 118).

In some embodiments, the robotic system 101 is programmed or otherwise configured to use a library or other repository of strategies to perform the pick and place operation and/or portions thereof. For example, the robotic system 101 may be configured to use awareness of its current position and the environment 100 to position end effector 108 at a location above table 110. Computer vision or other techniques may be used to identify and select an item to pick up next, and a strategy to pick up the item may be selected autonomously, e.g., based on one or more of the item's location, shape, orientation, aspect presented, texture, rigidity, etc.

For example, in the example shown in FIG. 1, the robotic system 101 may have recognized a feature associated with item 112 as having a cube geometry and selected a grasp strategy for cube geometries prior to picking up item 112. The robot may recognize item 114 as having a pyramid geometry and select a grasp strategy for pyramid geometries. The robot may recognize item 116 as having a cylindrical geometry and select a grasp strategy for cylindrical geometries.

Environment 100 includes a plurality of cameras, such as cameras 115, 117. Although FIG. 1 depicts environment 100 having two cameras, environment 100 may include n cameras where n is a number greater than one. The plurality of cameras may be wired to or wirelessly coupled to the robotic system 101. In some embodiments, at least one of the plurality of cameras is at a fixed location. In some embodiments, at least one of the plurality of cameras is dynamically moving (e.g., attached to a moving object, such as a drone). In some embodiments, at least one of the plurality of cameras is capable of being stationary and moved to a different location (e.g., detect an item at a first location, move the camera to a second location, and detect the item at the second location). In some embodiments, different lighting conditions are used in environment 100 to detect changes in perceived surface features of one or more items.

Using a plurality of cameras enables the robotic system 101 to view environment 100 from different vantage points. This prevents items from being obscured and gives more accurate estimates of the item geometries and item boundaries. For example, a large item may be placed in such a way that it prevents a camera from seeing a smaller item next to the large item, i.e., the smaller item is occluded from the camera. Using a plurality of cameras from different locations enables the smaller item to be seen and boundary information associated with the smaller item to be determined. A large workspace area may not be covered by a single camera. The views associated with a plurality of cameras may be merged to give the robotic system 101 a more complete view of the workspace area 110. In the event one of the cameras is blocked, the robotic system 101 is still able to pick and place items.

In some embodiments, the robotic system 101 segments items based on a point cloud generated by one or more of the plurality of cameras. Robotic system 101 can segment the items based on the RGB or multi-spectrum camera image (e.g., a combination of RGB, Depth, and/or Infrared, etc.). The segmented objects can be deprojected into a point cloud so that potential graspable areas can be determined. This provides additional information, such as item type, expected weight/material, preferred grasp strategy, etc., that is not available when segmenting an item based on point cloud information alone. This combined segmenting strategy works well when picking items that are difficult to distinguish with depth alone (e.g.,. small boxes that are tightly packed together could look like a single plane as a point cloud), but using image segmentation combined with point cloud information, robotic system 101 can identify each box and extract the box from the input.

In some embodiments, the robotic system 101 autonomously picks and places unknown items from table 110 (e.g., a workspace area) to conveyor belt 118 (e.g., a drop off area). The robotic system 101 may determine that items 112, 114, 116 are located on table 110 through the use of cameras 115, 117. Controller 106 determines geometry information based on visual data (e.g., point cloud data) received from cameras 115, 117. Controller 106 selects corresponding potentially graspable features for items 112, 114, 116 that correspond to the geometry information determined from the visual data received from cameras 115, 117. For example, based on the visual data received from cameras 115, 117, controller 106 may determine that item 112 includes a graspable feature that corresponds to a cube shape, item 114 includes a graspable feature that corresponds to a pyramid shape, and item 116 includes a cylindrical shape. Controller 106 may select a graspable feature that most closely resembles a geometric object within a threshold amount. For example, controller 106 may compare the determined geometry information with a library of known features and select a feature for the item based on the comparison. In some embodiments, the features are canonical shapes. Controller 106 may superimpose the canonical shapes on the items to be grasped.

To determine one or more graspable features associated with an item, controller 106 may randomly cut planes of an item to decompose the item into a plurality of sub-segments. The item may be cut at planes with minimum occupancy of data points of a point cloud (related to grasping a pointy feature at the top of an item). Planes of an item may be cut based on strong gradients in color or appearance of the item. In some embodiments, a membership function is used to determine if there are outliers in a point cloud within a generic generated sub-region. An additional cutting plane may be added or the item may be split in segregate areas with high residuals. The sub-segments may be processed separately. For example, outlier detection techniques may be applied to the sub-segments. In some embodiments, a 5-sigma fits a Gaussian distribution to the points and identifies points that are 5-sigma (standard deviation) away from the mean, and marks the identified points as outliers. In some embodiments, a subsampling method is used on the point cloud and refit to a mean. The points are then used to find points that are a certain distance away from the mean.

In some embodiments, sub-segments of an item are determined based on a reach of end effector's 108 interaction with the item. For example, if end effector 108 is unable to grasp across a wide item, then controller 108 determines not to grasp the item around the wide portion of the item. If a suction gripper end effector is being used, then a relatively smooth flat surface is sought out. Void-based picking strategies or minimum occupancy cutting planes may be avoided. Primitives are re-fit to the new partitioned cloud. The process may repeat iteratively until some level of quality or recursion limit is met.

Controller 106 may determine negative space information (e.g., voids) associated with an item based on the visual data received from cameras 115, 117. For example, controller 106 may determine that a handle of a coffee mug includes negative space or that a car tire includes negative space. Computer vision algorithms using the data from the plurality of cameras may determine voids (e.g., holes) in items, such as cups, mugs, rolled up wire, tape, etc. In the event a void is detected, an item may be grasped by inserting a gripper into the void and picking the item from a side wall of the item.

Controller 106 may determine the curvature of an item that is going to be picked based on the visual data received from cameras 115, 117. In the event controller 106 determines that the item is curved, controller 106 may change a control strategy associated with placing an item, such that the curved item is placed more carefully and more slowly ungripped to prevent the item from rolling away when placed. In some embodiments, the curved item includes a flatter surface. Robotic system 101 may place the item on the flatter surface and reorient the item to achieve a more stable placement. In the event the visual data received from cameras 115, 117 indicates that a placed item is rolling or moving after a grip of the item is initially released, controller 106 may re-grip the item and try to settle the item before the grip is released again. In the event controller 106 attempts to grip/re-grip the item more than a threshold number of times, a warning may be provided to user 130 and alert user 130 that the item may roll away.

Controller 106 determines corresponding features associated with item 112, 114, 116 based on the visual data received from cameras 115, 117. For example, controller 106 may determine that an item includes a handle. The visual data received from cameras may be used to determine a minimum boundary associated with an item and a maximum boundary associated with the item. A boundary of the item includes a height, width, or depth associated with the item. The visual data may provide data that allows one or more of the boundaries of the item to be determined.

Controller 106 is associated with a memory (not shown) that stores a data structure that associates grasping strategies with features. A grasping strategy may be comprised of a grasping technique and how to grasp a feature using the grasping technique. In some embodiments, a grasping strategy includes grasping a major and minor axes of a bounding box that can be fit to the geometric estimate of object/segment. In some embodiments, a grasping strategy includes cutting the item/segment estimate at some Z-height and recalculating a bounding box. The major and minor axes of the recalculated bounding box may then be grasped. This is useful when an item has a wide base but a small tower somewhere in the middle and the robotic system wants to accurately grasp the tower. The memory also stores instructions on how to perform the grasping techniques. The instructions may include instructions to partially pre-close a gripper if required to avoid impacting other items. The memory also stores instructions on how to perform the placing techniques. The instructions may include instructions to partially open gripper fingers of end effector 108 so that end effector 108 does not disrupt other items while placing the item at a drop off area. The memory also stores information regarding an end effector's mechanism and geometry (e.g., parallel gripper vs suction gripper, width/length of the gripper fingers, etc.).

A grasping technique may be associated with one or more features. For example, a suction technique may be used for items with a graspable feature that corresponds to a pyramidal shape, a graspable feature that corresponds to a cube shape, or a graspable feature that corresponds to a rectangular prism shape. A parallel gripping technique may be used for items with a graspable feature that corresponds to a spherical shape. A feature may be associated with one or more grasping techniques. For example, a parallel gripping technique or a scooping technique may be used for a graspable feature that corresponds to a spherical shape. Different types of grippers may be used to grasp a feature having a particular shape. For example, a first grasping technique may use a parallel gripper and a second grasping technique may use a suction gripper. In some embodiments, the types of grippers are autonomously switched between gripper types during a pick and place operation. A grasping technique may be used at different portions of a feature. For example, a parallel gripping technique may be used on a top, middle, or bottom portion of a feature. Controller 106 determines corresponding scores for each of the grasping strategies associated with a feature. In some embodiments, an item is associated with a plurality of features. Controller 106 may determine one or more grasping techniques for each of the plurality of features and determine corresponding scores for the determined grasping techniques.

A score associated with a grasping strategy may be based on a probability that the grasping strategy will result in a successful grasp of the feature. The probability that the grasping strategy will result in a successful grasp of the feature may be based on one more modalities, such as contextual information about the environment, historical grasp information for the environment, an angle at which a robotic arm is to grasp the feature (to avoid collision with other items), a height at which a robotic arm is to grasp the feature (to prevent collision at the top of the gripper), grip width, orientation of surface normal at grasp points, the amount of the feature that is capable of being grasped, material properties, etc. Contextual information about the environment includes the existence of other items near or adjacent to the item, the amount that the other items near or adjacent to the item hinder an ability of a robotic arm to grasp the feature, whether more items are continuously being added to a workspace area, etc. Material properties may include a center of mass of an item, a friction property of the item, color, reflectivity, etc. For example, robotic system 101 may build a large supporting surface so that a large item can be placed with stability. When robotic system 101 detects that an item could slid off a tilted placement support surface given the friction coefficients of the item and the placement support surface, robotic system 101 may be configured to only choose to pick items with high enough coefficients of friction (e.g., to avoid sliding).

Controller 106 selects one of the grasping strategies based on the corresponding scores associated with each of the grasping strategies. The items may be a heterogeneous collection of items that are placed in a cluttered pile. Items may vary in size, color, height, geometry, texture, stiffness, etc. Items are individually removed from the pile. Some of the items are at least partially occluded. All items in the cluttered pile are unknown a priori. Controller 106 selects the grasping strategy with the highest score. In the event two or more grasping strategies have the same high score, controller 106 selects one of the grasping strategies, picks the feature associated with the grasping strategy, moves the item to a drop off area, and then selects a remaining item associated with the other grasping strategies.

Controller 106 causes end effector 108 to grasp a feature associated with an item. In the example shown, controller 106 has caused end effector 108 to grasp item 112. Controller 106 may leverage prior knowledge about the gripper mechanism and geometry to simplify the grasp prediction problem. For example, if end effector 108 will approach an item, such as item 112 from above, controller 106 analyzes the top section of a point cloud to identify graspable protrusions. In some embodiments, as the robotic system moves, cameras 115, 117 collect more data (e.g., closer, different angles, different lighting, reflectivity, etc.) and the robotic system 101 adjusts how it causes end effector 108 to grasp an item based on the new data.

Grasp points for an item may be determined using a meshified or segmented version of the item. A close approximation of the item to be grasp is built and a model matching with a library or a machine learning method is used to determine an optimal grasp location for the item. The grasp points are ranked. Controller 106 causes end effector 108 to grasp an item at one of the grasp points.

In various embodiments, end effector 108 includes one or more tactile sensing units (not shown) as disclosed herein. The system uses sensed values from the tactile sensing unit(s) to determine whether an item was successfully grasped. The system also uses sensed values from the tactile sensing unit(s) to determine whether an item is starting to slip or is slipping from a grasp of end effector 108. In some embodiments, the system uses sensed values from the tactile sensing unit(s) and a multi-modal model to determine and implement a strategy to reorient and/or otherwise reposition an item in the grasp of the end effector 108. For example, the system may intentionally ease its grip on an item to a point at which the item begins to slip in an expected and intended manner, such as by sliding in a downward direction, between the fingers or other engagement structures of the end effector 108, or by rotating while still in the grasp of the end effector 108. Once the item is in a desired position and/or orientation, more force is applied as needed to halt and prevent further slippage. The tactile sensing unit includes one or more sensors. Each of the one or more sensors is configured to provide an output that reflects a sensed value associated with engagement of end effector 108 with an item, such as item 112. The one or more sensor outputs are used to determine a plurality of modalities indicative of engagement of end effector 108 with an item.

The one or more sensors may include one or more of magnetic sensors, optical sensors, electromechanical sensors, pressure sensors, strain gages, force sensors, conductivity sensors, current sensors, voltage sensors, capacitance sensors, resistance sensors, inductance sensors, infrared sensors, temperature sensors, etc. The plurality of modalities may include weight, deformation, continuity, conductivity, pressure, resistance, inductance, capacitance or any other factor that is indicative of robotic arm end effector engagement.

The one or more tactile sensing units are coupled to controller 106. End effector 108 may include other sensors that are also coupled to the controller 106. For example, a housing that connects the fingers of end effector 108 to robotic arm 102 may include one or more sensors that are used to measure force and/or torque. The plurality of sensors (tactile sensing unit sensor(s) and/or housing sensor(s)) provide their corresponding outputs to controller 106. Controller 106 may use the sensor outputs to determine one or more forces and/or one or more moments associated with an engagement between end effector 108 and an item, such as item 112. Controller 106 may use the sensor outputs to determine forces and moments associated with each of the tactile sensing units.

Controller 106 may use the sensor outputs to determine corresponding values for the plurality of modalities. For example, a sensed weight, a sensed deformation, a sensed conductivity, a sensed pressure, a sensed resistance, a sensed inductance, and/or a sensed capacitance may be determined. The plurality of modalities are each associated with a coefficient. In some embodiments, the plurality of modalities are weighted equally (e.g., they each have an associated coefficient of "1"). In some embodiments, some of the plurality of modalities have different weights. For example, the selected item may be a metal object and the coefficient associated with a conductivity factor may be less than the coefficient associated with a deformation factor.

Controller 106 may implement a multi-modal model to determine whether the robotic arm end effector grasped an item. Controller 106 may also implement the multi-modal model to determine whether an item is starting to slip and/or is slipping from a grasp of end effector 108. The multi-modal model may be a rule-based model, a predictive model, machine learning model (e.g., neural network, linear classifier, support vector machine, linear regression, logistic regression, decision tree, deep learning, etc.), etc. In some embodiments, the multi-modal model is configured to output a binary decision regarding whether the item is starting to slip from the grasp of end effector 108. In some embodiments, the multi-modal model is configured to output a binary decision regarding whether the item is slipping from the grasp of end effector 108. In some embodiments, the multi-modal model is configured to output a probability of whether the item is starting to slip from a grasp of end effector 108. In some embodiments, the multi-modal model is configured to output a probability of whether the item is slipping from a grasp of end effector 108.

The input (e.g., values associated with some or all of the modalities) is applied to the multi-modal model and robotic system 101 is configured to perform a responsive action based on an output of the multi-modal model. In some embodiments, robotic system 101 moves the item from table 110 to conveyor belt 118. In some embodiments, robotic system 101 applies additional force to grasp the item. In some embodiments, robotic system 101 sets the item down and re-grasps the item. In some embodiments, robotic system 101 requests human intervention. In some embodiments, robotic system 101 adjusts a manner in which the robotic system is grasping the item. In some embodiments, robotic system 101 changes its grasp configuration to let the item rest on a palm of robotic arm 102 or other part of robotic system 101 without setting the item down.

End effector 108 moves an item, in this example item 112, to a drop off area, such as conveyor 118. End effector 108 places the item in the drop off area. The robotic system 101 may use the plurality of cameras to place the item at a location near where the robotic system 101 thinks the item should be placed. The robotic system 101 may lower the item at the drop of location and detect when the robot system 101 feels the force of the drop off area push back against it. In some embodiment, robotic system 101 uses the mechanical vibrations at the impact between the bottom of an item and the drop off area to confirm the item is being successfully placed on the supporting surface. When the robotic system 101 detects that the drop off area has been reached, the robotic system 101 opens end effector 108 or stops suction to place the item down gently. While opening end effector 108, the robotic system 101 may move up or down to control the placement force (sometimes opening the gripper while in contact can crush items). This enables the robotic system 101 to stack items or to dynamically adjust placement height when the placement surface height estimate is error prone or unknown. This also helps when other items are in the way. In some embodiments, robotic system 101 determines whether any items that may roll away are placed in a drop off area. In the event there are no items that might roll away, controller 106 may control the robotic arm 102 and end effector 108 to push items already in drop off area closer together so that space is created to place one or more other items. In the event there are items that might roll away or tip over, controller 106 may control the robotic arm 102 and end effector 108 to rotate the item and place the stable supporting surface of the item onto the drop off area.

In various embodiments, the robotic system 101 automatically prompts intervention by teleoperation. In some embodiments, if in the course of performing the pick and place operation shown in FIG. 1 the robotic system 101 reaches a state in which the robotic system 101 cannot determine a (next) strategy to (further) perform the operation, the robotic system 101 prompts a remote operator (in this example) to assist via teleoperation.

In the example shown, controller 106 is connected via network 124 to a teleoperation computer 126. In some embodiments, teleoperation computer 126 may be involved in operation of the robotic system 101 in the autonomous mode, e.g., by communicating high level instructions to controller 106 via network 124. In various embodiments, one or both of the controller 106 and teleoperation computer 126 may prompt an intervention by teleoperation, e.g., if the robotic system 101 reaches a state in which it does not have a strategy available to perform (complete) a next task or step in the operation.

For example, referring further to FIG. 1, if object 114 were dropped and landed on one of its flat sides, in an orientation that presented a triangular aspect to the robot, in some embodiments the robotic system 101 may not have a strategy available to pick up the item 114 and/or may have timed out or exhausted a configured number of attempts to pick up the item 114. In response, teleoperator 130 may be prompted to intervene through teleoperation, and may use the manual input device 128 to control operation of the robot. For example, teleoperator 130 may manipulate the robotic system 101 to pick up the item 114 and place the item on the conveyor belt 118. Or, teleoperator 130 may use the robotic system 101 to change the orientation of the item 114 to one in which the autonomous robotic system 101 would be expected (or be more likely) to have a strategy available to pick up the item 114.

In some embodiments, robotic system 101 monitors the teleoperation and updates the multi-modal model based on the teleoperation. For example, the sensors associated with robotic system 101 (e.g., the tactile sensing unit sensor(s) and/or housing sensor(s)) may output values during teleoperation. In the event a teleoperation grasp attempt results in a successful grasp of an item, the robotic system may learn of sensor output values that are indicative of a successful grasp and use those learned values for subsequent autonomous grasps to determine whether an item was successfully grasped. In the event a teleoperation grasp attempt results in an unsuccessful grasp of an item, the robotic system may learn of sensor output values that are indicative of an unsuccessful grasp and use those learned values for subsequent autonomous grasps to determine whether an item was not successfully grasped. Teleoperation may be performed a plurality of instances. Over the plurality of instances, the robotic system may learn a range of sensor output values that are indicative of a successful grasp and a range of sensor output values that are indicative of an unsuccessful grasp. Corresponding ranges may be learned for different types, shapes, and/or sizes of items.

In the example shown, teleoperation may be performed through manipulation of a manual input device 128, e.g., a haptic input device, by a human operator 130. The human operator 130 (sometimes referred to as a teleoperator) may be prompted by information displayed via a display device comprising and/or associated with the teleoperation computer 126 to begin teleoperation. Data from one or more sensors 134 may be provided to the human operator 130 via network 124 and teleoperation computer 126. In some embodiments, sensors 134 include a camera on the robot (not shown) or cameras 115, 117 and are configured to generate a video feed that is displayed to the teleoperator 130 and used to perform and/or complete performance of an operation or portion thereof via teleoperation. In various embodiments, the camera is connected with a low-latency, high throughput connection, including by way of example and without limitation one or more of analog RF based communication, WiFi, Bluetooth, and Sub GHz. In some embodiments, a mix of cameras of different types is used. For example, cameras with different communication rates, bandwidth, and/or other characteristics may be used, such as two RGB visual cameras, four depth cameras, two IR cameras, etc.

In various embodiments, teleoperation may be performed using a variety of different sensors 134. In some embodiments, these may guide the robotic system 101 in determining whether it is "stuck", and/or may simplify the teleoperation. In some embodiments, sensors help transition the teleoperation modality from direct haptic controls to increasingly abstract executive commands (such as clicking an object to pick with a mouse, or saying "open shelf" to an audio transcription device).

Examples of sensors 134 used in various embodiments include digital switches that are configured to detect interactions and specific "stuck" scenarios with the environment, and/or the presence of unknown agents in the vicinity of the robotic system 101 (or teleoperator). Further examples include force or pressure sensors on the hand or robot that determine success or failure of operations such as grasps. After some series of failures, the robotic system 101 determines it is "stuck." Another example is one or more sensors, such as position sensors on the robot joints, which may be used by the robotic system 101 to know whether the planned and/or otherwise expected movement trajectory is being followed precisely. When it is not following the expected trajectory precisely, likely it has made contact with the environment 100 and the robotic system 101 may be programmed to conclude it has gotten "stuck" and needs to invoke human intervention.

A vision system that includes the plurality of cameras is configured to keep track of each item in a workspace area through multi modal means (e.g., RGB instance tracking, RGB feature matching, RGB optical flow, point cloud matching, etc.) and utilize methods, such as Hungarian pair matching, to keep track of the items that robotic system 101 is to pick. Robotic system 101 is configured to estimate the states of each tracked item, such as velocity, potential to fall/slide away, and trajectory of motion. Robotic system 101 may use other known information, such as current speed and size of the conveyance systems and sensors 134 to update the item states with higher accuracy. The determined item states may be used by robotic system 101 to make informed decisions about where and what items to pick, and where/when/how to place the items. For example, robotic system 101 may select more stable items to pick (grasp) and possibly pick (even while moving) from an estimated item location in the future to compensate for movement time of robotic arm 102 and a velocity of a moving item. Robotic system 101 may place an item onto a moving platform drop-off area more steadily without dropping and causing the item to roll by placing the item with an initial velocity as estimated from environment 100. Robotic system 101 may also choose collision free zones to place items in drop-off area 118. The collision zones may be determined from estimated trajectories of tracked items. Using the data associated with the plurality of cameras, robotic system 101 is able to understand the shape of the grasped item and environment 100. This enables robotic system 101 to intelligently plan trajectories that will avoid collisions between the picked items and environment 100.

In some embodiments, a plurality of robotic systems are working together to pick and place items. Using a plurality of robotic systems may increase the overall throughput of the system.

Figure 2:
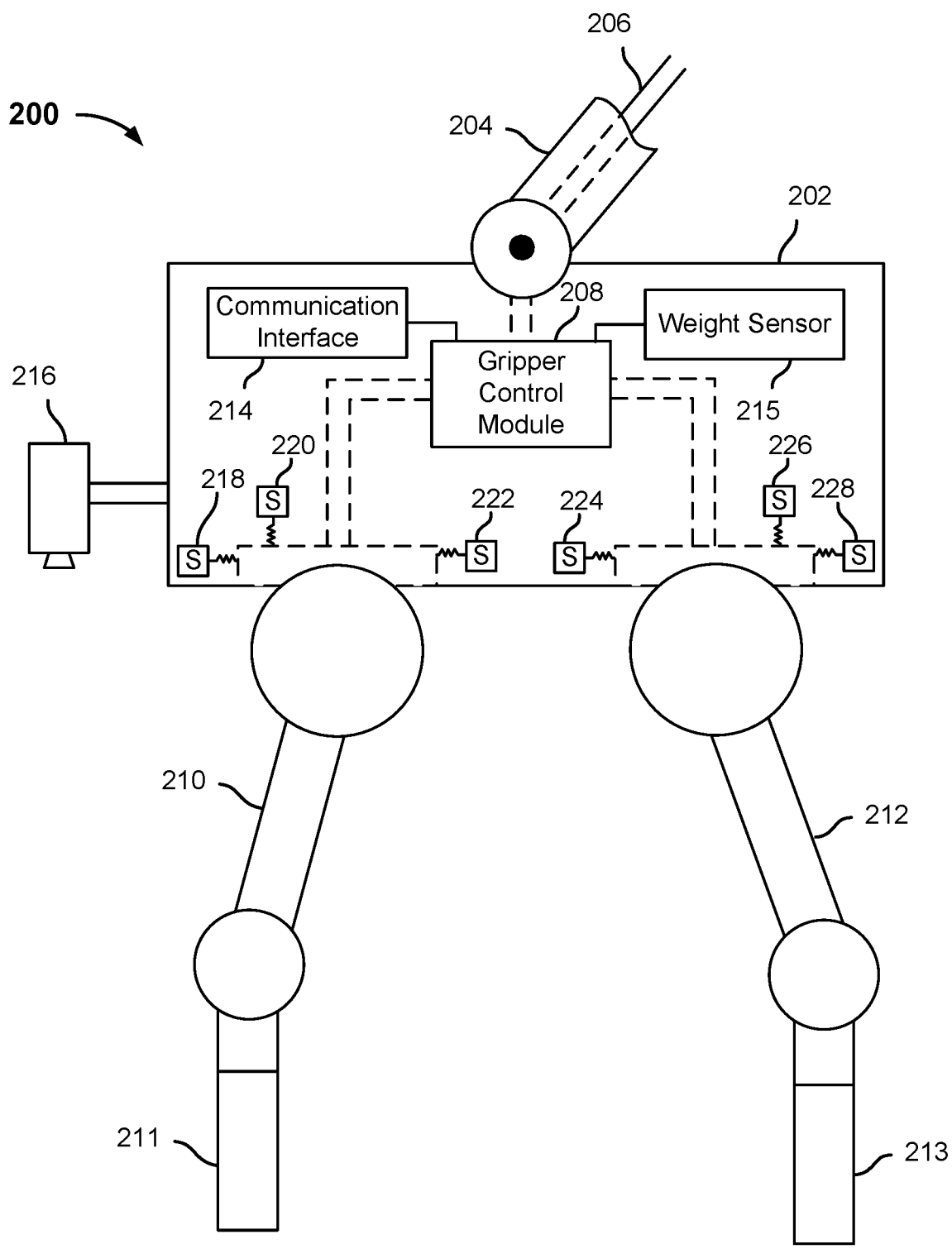
FIG. 2 is a block diagram illustrating a robotic arm end effector in accordance with some embodiments.

FIG. 2 is a block diagram illustrating a robotic arm end effector in accordance with some embodiments. In various embodiments, end effector 200 may be used to implement end effector 108 of FIG. 1.

In the example shown, end effector 200 includes a body or housing 202 attached to robotic arm 204 via a rotatable coupling. In some embodiments, the connection between housing 202 and robotic arm 204 may comprise a motorized joint controlled by a control computer, such as controller 106 of FIG. 1. End effector 200 further includes a gripper comprising articulating digits 210 and 212 and a power line 206 that runs through the robotic arm 204 into the housing 202 to supply electrical power to gripper control module 208. In various embodiments, control module 208 is connected, e.g., via wireless and/or wired communication through communication interface 214 to a control computer external to end effector 200, e.g., controller 106 of FIG. 1. The control module 208 includes electronic and/or electromechanical elements operable to manipulate the gripper digits 210, 212, e.g., to grasp an item to be picked up, moved, and placed using end effector 200.

In the example shown, a camera 216 mounted on the side of housing 202 provides image data of a field of view below the end effector 200. A plurality of force sensors 218, 220, 222, 224, 226, and 228 measure force applied to the mount points of digits 210 and 212, respectively. In various embodiments, the force measurements are communicated via communication interface 214 to an external and/or remote control computer. The sensor readings are used in various embodiments to enable the robotic arm 204 and end effector 200 to be used to snug an item into place adjacent to other items and/or sidewalls or other structures, and/or to detect instability (e.g., insufficient push back with the item is pressed down upon while still under suction but in the place in which the item was expected to be placed and to be stable).

In some embodiments, sensors are used to detect collisions with other items, the receptacle, and/or the environment, and to continue automated operation by "compliant" adjustment of the trajectory. For example, if a wall or other structure is bumped into, in some embodiments, the robotic arm reduces force and adjusts the trajectory to follow along the obstacle until it is clear of it.

Weight sensor 215 may be a force sensor, a load cell, or any other sensor that is capable of detecting a force that is directly or indirectly applied to housing 202. Weight sensor 215 may be configured to measure rotational and/or directional torque. Weight sensor 215 may be configured to measure a force and a moment when end effector 202 engages an item.

Tactile sensing units 211, 213 are associated with articulating digits 210, 212, respectively. In some embodiments, tactile sensing units 211, 213 are attached to digits 210, 212, respectively. In some embodiments, tactile sensing units 211, 213 are included in a sensing covering that is placed over end effector 200 such that each of the digits 210, 212 has a corresponding tactile sensing unit 211. The sensing covering may cover digits 210, 212, as well as housing 202. In some embodiments, tactile sensing units 211, 213 are the same type of tactile sensing units. In some embodiments, tactile sensing units 211, 213 are different types of tactile sensing units. For example, digit 210 may be associated with the tactile sensing unit depicted in FIG. 3B and digit 212 may be associated with the tactile sensing unit depicted in FIG. 3E.

Figure 3A:
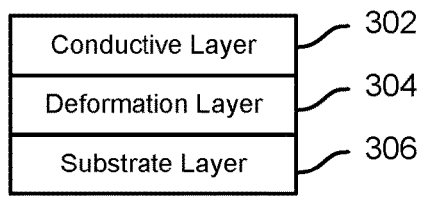
FIG. 3A is a block diagram illustrating a tactile sensing unit in accordance with some embodiments.

FIG. 3A is a block diagram illustrating a tactile sensing unit in accordance with some embodiments. In the example shown, tactile sensing unit 300 may be implemented as a tactile sensing unit, such as tactile sensing unit 211 or tactile sensing unit 213.

Tactile sensing unit 300 includes a conductive layer 302, a deformation layer 304, and a substrate layer 306. In some embodiments, conductive layer 302, deformation layer 304, and substrate layer 306 are planar layers. In some embodiments, conductive layer 302, deformation layer 304, and substrate layer 306 are curved layers. Tactile sensing unit 300 is coupled to a processor (not shown). In some embodiments, conductive layer 302 or substrate layer 306 are optional. In some embodiments, conductive layer 302 and deformation layer 304 are combined into a single layer.

Conductive layer 302 may include conductive material that enables continuity or other electrical properties, such as conductivity, resistance, capacitance, or inductance, to be sensed. For example, conductive layer 302 may be a top layer of a tactile sensing unit such that when a first tactile sensing unit attached to a first finger contacts a second tactile sensing unit attached to a second finger, the conductive layers of the first and second tactile sensing units come into contact. Before a grasp operation, a reference continuity value, a reference conductivity value, a reference resistance value, a reference capacitance value, and/or a reference inductance value may be determined. The reference sensed values may be a tare value before the robotic arm end effector is engaged with an item. During a grasping operation, the end effector may use its fingers to grasp an item and the processor may transmit an electrical signal to a first tactile sensing unit to determine one or more continuity values, one or more conductivity values, one or more resistance values, one or more capacitance values, and/or one or more inductance values. In some embodiments, the electrical signal varies in frequency. The one or more determined continuity values, the one or more determined conductivity values, the one or more determined resistance values, the one or more determined capacitance values, or the one or more determined inductance values may indicate that the end effector grasped or did not grasp the item.

While the robotic arm end effector is grasping an item that is being moved from a first location to a second location, the sensed values associated with the conducive layer may vary. A processor of the robotic system may monitor the sensed values over time while the robotic arm end effector is moving the item from the first location to the second location to determine whether the item is starting to slip from a grasp of the robotic arm end effector and/or is slipping from the grasp of the robotic arm end effector.

When the robotic end effector successfully grasps an item, the successful grasp may have an associated continuity value. While the robotic arm end effector is grasping an item that is being moved from a first location to a second location, the processor may compare a current continuity value to the continuity value associated with a successful grasp. In the event the current continuity value changes from the continuity value associated with a successful grasp by a threshold amount (i.e., the conductive layers of two tactile sensing units are in contact), the current continuity value may indicate that the item is slipping from a grasp of the end effector. In the event the current continuity value does not change from the continuity value associated with a successful grasp by the threshold amount, the current continuity value may indicate that the item is not slipping from the grasp of the end effector.

When the robotic end effector successfully grasps an item, the successful grasp may have an associated conductivity value. While the robotic arm end effector is grasping an item that is being moved from a first location to a second location, the processor may compare a current conductivity value to the conductivity value associated with a successful grasp. In the event the current conductivity value changes from the conductivity value associated with a successful grasp by a first threshold amount, the current conductivity value may indicate that the item is starting to slip from the grasp of the end effector. In the event the current conductivity value does not change from the conductivity value associated with a successful grasp by the first threshold amount, the current conductivity may indicate that the item is not starting to slip from the grasp of the end effector. In the event the current conductivity value changes from the conductivity value associated with a successful grasp by a second threshold amount, the current conductivity value may indicate that the item is slipping from the grasp of the end effector. The second threshold amount may be greater than the first threshold amount.

In some embodiments, when the robotic end effector successfully grasps an item, the successful grasp may have an associated conductivity profile. The conductivity profile may be comprised of one or more conductivity values based on an output from one or more tactile sensors. While the robotic arm end effector is grasping an item that is being moved from a first location to a second location, the processor may compare a current conductivity profile to the conductivity profile associated with a successful grasp. In the event the current conductivity profile changes from the conductivity profile associated with a successful grasp (e.g., by a first threshold amount), the current conductivity profile may indicate that the item is starting to slip from the grasp of the end effector. In the event the current conductivity profile does not change from the conductivity profile associated with a successful grasp, the current conductivity profile may indicate that the item is not starting to slip from the grasp of the end effector. In the event the current conductivity profile changes from the conductivity profile that indicates the item is starting to slip from the grasp of the end effector (e.g., by a second threshold amount), the current conductivity profile may indicate that the item is slipping from the grasp of the end effector.

When the robotic end effector successfully grasps an item, the successful grasp may have an associated resistance value. While the robotic arm end effector is grasping an item that is being from a first location to a second location, the processor may compare a current resistance value to the resistance value associated with a successful grasp. In the event the current resistance value changes from the resistance value associated with a successful grasp by a threshold amount, the current resistance value may indicate that the item is starting to slip from the grasp of the end effector. In the event the current resistance value does not change from the resistance value associated with a successful grasp by the threshold amount, the current resistance value may indicate that the item is not starting to slip from the grasp of the end effector. In the event the current resistance value changes from the resistance value associated with a successful grasp by a second threshold amount, the current resistance value may indicate that the item is slipping from the grasp of the end effector. The second threshold amount may be greater than the first threshold amount.

In some embodiments, when the robotic end effector successfully grasps an item, the successful grasp may have an associated resistance profile. The resistance profile may be comprised of one or more resistance values based on an output from one or more tactile sensors. While the robotic arm end effector is grasping an item that is being moved from a first location to a second location, the processor may compare a current resistance profile to the resistance profile associated with a successful grasp. In the event the current resistance profile changes from the resistance profile associated with a successful grasp (e.g., by a first threshold amount), the current resistance profile may indicate that the item is starting to slipping from the grasp of the end effector. In the event the current resistance profile does not change from the resistance profile associated with a successful grasp, the current resistance profile may indicate that the item is not starting to slip from the grasp of the end effector. In the event the current resistance profile changes from the resistance profile that indicates the item is starting to slip from the grasp of the end effector (e.g., by a second threshold amount), the current resistance profile may indicate that the item is slipping from the grasp of the end effector.

When the robotic end effector successfully grasps an item, the successful grasp may have an associated capacitance value. The processor may also determine a material of the grasped item based on the associated capacitance value. While the robotic arm end effector is grasping an item that is being moved from a first location to a second location, the processor may compare a current capacitance value to the capacitance value associated with a successful grasp. In the event the current capacitance value changes from the capacitance value associated with a successful grasp by a first threshold amount, the current capacitance value may indicate that the item is starting to slip from the grasp of the end effector. In the event the current capacitance value does not change from the capacitance value associated with a successful grasp by the first threshold amount, the current capacitance value may indicate that the item is not slipping from the grasp of the end effector. In the event the current capacitance value changes from the capacitance value associated with a successful grasp by a second threshold amount, the current capacitance value may indicate that the item is slipping from the grasp of the end effector. The second threshold amount may be greater than the first threshold amount.

In some embodiments, when the robotic end effector successfully grasps an item, the successful grasp may have an associated capacitance profile. The capacitance profile may be comprised of one or more capacitance values based on an output from one or more tactile sensors. The processor may also determine a material of the grasped item based on the associated capacitance value. While the robotic arm end effector is grasping an item that is being moved from a first location to a second location, the processor may compare a current capacitance profile to the capacitance profile associated with a successful grasp. In the event the current capacitance profile changes from the capacitance profile associated with a successful grasp (e.g., by a first threshold amount), the current capacitance profile may indicate that the item is starting to slip from the grasp of the end effector. In the event the current capacitance profile does not change from the capacitance profile associated with a successful grasp, the current capacitance profile may indicate that the item is not starting to slip from the grasp of the end effector. In the event the current capacitance profile changes from the capacitance profile that indicates the item is starting to slip from the grasp of the end effector (e.g., by a second threshold amount), the current capacitance profile may indicate that the item is slipping from the grasp of the end effector.

When the robotic end effector successfully grasps an item, the successful grasp may have an associated inductance value. While the robotic arm end effector is grasping an item that is being moved from a first location to a second location, the processor may compare a current inductance value to the inductance value associated with a successful grasp. In the event the current inductance value changes from the inductance value associated with a successful grasp by a first threshold amount (i.e., the conductive layers of two tactile sensing units are in contact), the current inductance value may indicate that the item is starting to slip from the grasp of the end effector. In the event the current inductance value does not change from the inductance value associated with a successful grasp by the first threshold amount, the current inductance value may indicate that the item is not starting to slip from the grasp of the end effector. In the event the current inductance value changes from the inductance value associated with a successful grasp by a second threshold amount, the current inductance value may indicate that the item is slipping from the grasp of the end effector. The second threshold amount may be greater than the first threshold amount.

In some embodiments, when the robotic end effector successfully grasps an item, the successful grasp may have an associated inductance profile. The inductance profile may be comprised of one or more inductance values based on an output from one or more tactile sensors. While the robotic arm end effector is grasping an item that is being moved from a first location to a second location, the processor may compare a current inductance profile to the inductance profile associated with a successful grasp. In the event the current inductance profile changes from the inductance profile associated with a successful grasp (e.g., by a first threshold amount), the current inductance profile may indicate that the item is starting to slip from the grasp of the end effector. In the event the current inductance profile does not change from the inductance profile associated with a successful grasp, the current inductance profile may indicate that the item is not starting to slip from the grasp of the end effector. In the event the current inductance profile changes from the inductance profile that indicates the item is starting to slip from the grasp of the end effector (e.g., by a second threshold amount), the current inductance profile may indicate that the item is slipping from the grasp of the end effector. The second threshold amount may be greater than the first threshold amount.

Deformation layer 304 may include a dielectric material (e.g., silicon, plastic, or any other material that is capable of being deformed in response to a force). Measurement objects may be injected into the dielectric material. For example, a plurality of magnets may be injected into the dielectric material.

Substrate layer 306 may include one or more sensors that are configured to sense a change associated with the measurement objects that are injected into deformation layer 304. For example, substrate layer 306 may include a magnetic sensor that is configured to sense a change in magnetic field when the plurality of magnets of deformation layer 304 are displaced. In some embodiments, substrate layer 306 is a finger associated with a robotic arm end effector. In some embodiments, substrate layer 306 is material that is configured to support one or more sensors and electrically connects the one or more sensors to a processor associated with the robotic system.

Figure 3B:
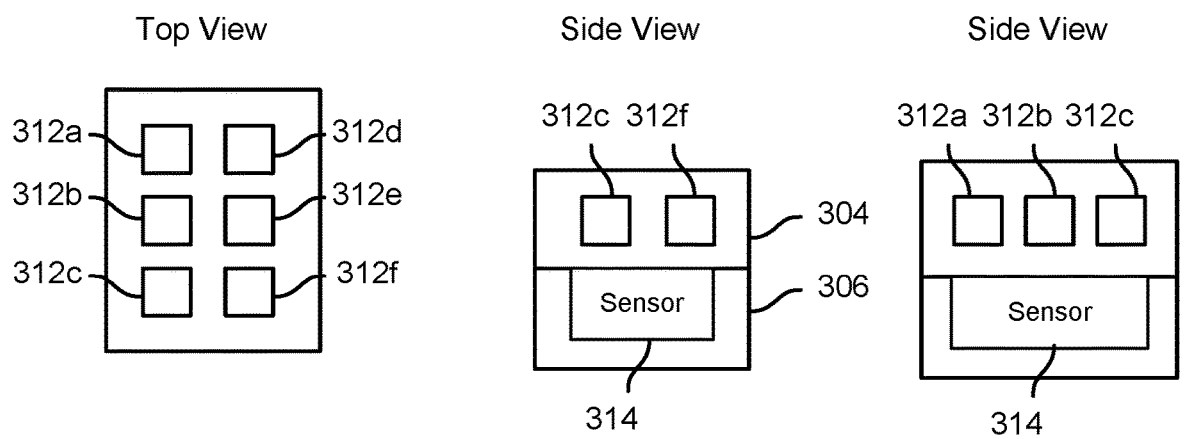
FIG. 3B is a diagram of illustrating a tactile sensing unit from different points of view in accordance with some embodiments.

FIG. 3B is a diagram of illustrating a tactile sensing unit from different points of view in accordance with some embodiments. In the example shown, the different points of view 310 illustrate a top view and two side views of a tactile sensor unit. A conductive layer of the tactile sensing unit is not shown for explanation purposes.

In the example shown, the deformation layer of the tactile sensing unit includes a plurality of measurement objects. In some embodiments, the plurality of measurement objects are magnets. In some embodiments, the plurality of measurement objects are markers. The plurality of measurement objects may be arranged in a grid or non-grid pattern. The grid pattern may be a 2D m×n grid pattern or a 3D l×m×n grid pattern. Measurement objects may be located on an edge boundary of the deformation layer 304.

In the example shown, measurement objects 312a, 312b, 312c, 312d, 312e, 312f are arranged in a 2×3 grid. Although six measurement objects are shown, x measurement objects may be injected into the deformation layer. The number of measurement objects that may be injected into the deformation layer may be based on an acceptable amount of cross talk between the measurement objects. For example, as the number of measurement objects in the deformation layer increases, the amount of crosstalk between the measurement objects also increases. The acceptable amount of crosstalk may be specified by an operator associated with the robotic system.

The plurality of measurement objects are associated with a sensor 314 located in substrate layer 306. In the event the plurality of measurement objects are magnets, sensor 314 is a magnetic sensor. In the event the plurality of measurement objects are markers, sensor 314 is an image sensor. In some embodiments, a measurement object is associated with one sensor. In some embodiments, a measurement object is associated with a plurality of sensors.

Before a grasp operation, a reference magnetic field for the plurality of magnets or a reference position for each of the markers may be determined. When the robotic arm end effector engages an item, a force and/or moment associated with the engagement causes one or more of the plurality of measurement objects to be displaced. This displacement causes a change in a measurable value that the sensor 314 is configured to sense. For example, in the event the plurality of measurement objects are magnets, sensor 314 may sense a change in a magnetic field associated with the plurality of magnets. A processor may be coupled to the magnetic sensor and compare the sensed magnetic field to the reference magnetic field. The sensed magnetic field may be different depending on whether the robotic arm end effector successfully or unsuccessfully grasped the item. The processor may determine a weight value and/or a deformation value based on comparison.

When the robotic end effector successfully grasps an item, the successful grasp may have an associated magnetic field. Sensor 314 may detect a current magnetic field while the robotic arm end effector is moving the item from the first location to the second location to determine whether the item is starting to slip and/or is slipping from the robotic arm end effector's grasp. The processor may monitor the current magnetic field, the current weight value, and the current deformation values for any changes. A change in the current magnetic field from the magnetic field associated with a successful grasp, the current weight value from the weight associated with a successful grasp, and/or the current deformation value from the deformation associated with a successful grasp that exceeds a corresponding first threshold may indicate that the item is starting to slip from the robotic arm end effector's grasp. A change in the current magnetic field from the magnetic field associated with a successful grasp, the current weight value from a weight value associated with a successful grasp, and/or the current deformation value from a deformation value associated with a successful grasp that exceeds a corresponding second threshold may indicate that the item is slipping from the robotic arm end effector's grasp.

In the event the plurality of measurement objects are markers, sensor 314 may sense a change in position associated with one or more of the plurality of markers. The change in position may be different depending on whether the robotic arm end effector successfully or unsuccessfully grasped the item. A processor may be coupled to the image sensor and compare the sensed positions of the plurality of markers to the reference positions of the plurality of markers to determine a weight value and/or a deformation value.

When the robotic end effector successfully grasps an item, the plurality of markers have corresponding positions. Sensor 314 may detect the position of the markers while the robotic arm end effector is moving the item from the first location to the second location to determine whether the item is starting to slip and/or is slipping from the robotic arm end effector's grasp. The processor may monitor the current positions, a current weight value, and a current deformation value for any changes. A change in the current positions from the positions associated with a successful grasp, the current weight value from a weight associated with a successful grasp, and/or a current deformation value from a deformation value associated with a successful grasp that exceeds a corresponding first threshold may indicate that the item is starting to slip from the robotic arm end effector's grasp. A change in the current positions from the positions associated with a successful grasp, the current weight value from a weight associated with a successful grasp, and/or a current deformation value from a deformation value associated with a successful grasp that exceeds a corresponding second threshold may indicate that the item is slipping from the robotic arm end effector's grasp.

Figure 3C:
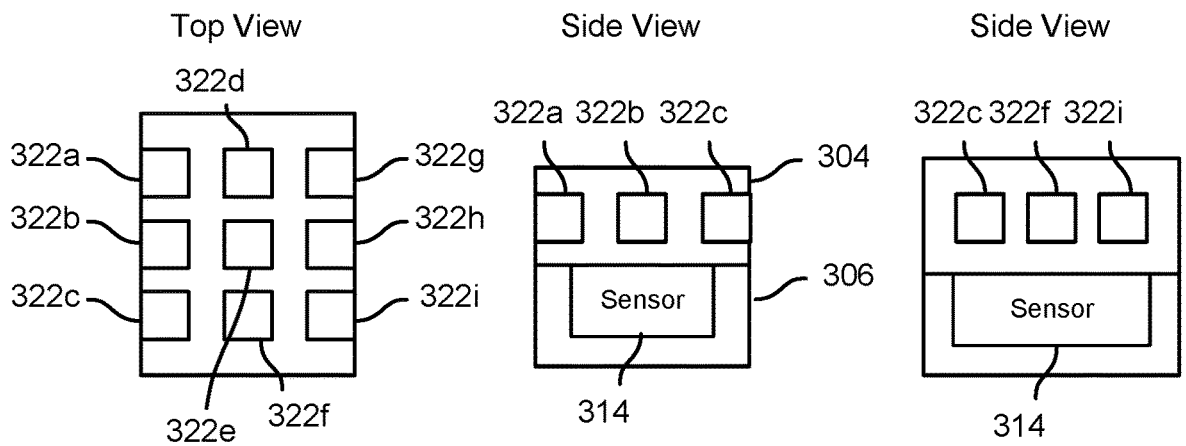
FIG. 3C is a diagram illustrating a tactile sensing unit from different points of view in accordance with some embodiments.

FIG. 3C is a diagram illustrating a tactile sensing unit from different points of view in accordance with some embodiments. In the example shown, the different points of view 320 illustrate a top view and two side views of a tactile sensor unit. A conductive layer of the tactile sensing unit is not shown for explanation purposes.

In the example shown, the measurement objects embedded in deformation layer 304 are magnets. The tactile sensing unit of FIG. 3C is similar to the tactile sensing unit of FIG. 3B except that a subset of the measurement objects (322a, 322b, 322c, 322g, 322h, 322i) are located on the sides of the deformation layer. A magnitude of the magnetic field associated with the measurement objects 322a, 322b, 322c, 322d, 322e, 322f, 322g, 322h, 322i that is sensed by sensor 314 may depend on a depth associated with deformation layer 304 and a distance between the measurement objects and sensor 314. Locating a subset of the measurement objects on the sides of the deformation layer may increase the magnitude of the magnetic field associated with measurement objects 322a, 322b, 322c, 322d, 322e, 322f, 322g, 322h, 322i that is sensed by sensor 314.

Figure 3D:
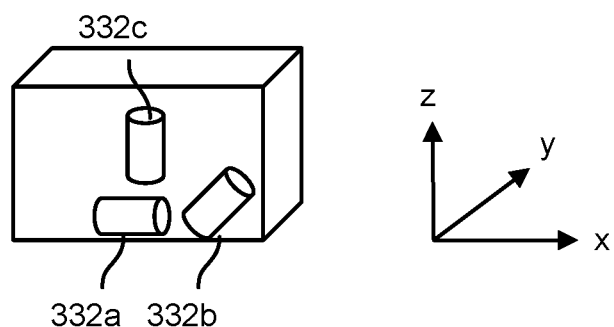
FIG. 3D is a diagram illustrating an example of a magnetic sensor in accordance with some embodiments.

FIG. 3D is a diagram illustrating an example of a magnetic sensor in accordance with some embodiments. Magnetic sensor 330 may be implemented as a sensor, such as sensor 314. In the example shown, magnetic sensor 330 includes coils 332a, 332b, 332c. Coil 332a is configured to measure a magnetic field in the x-axis direction. Coil 332b is configured to measure a magnetic field in the y-axis direction. Coil 332c is configured to measure a magnetic field in the z-axis direction. Magnetic sensor 330 may be coupled to a plurality of magnets, such as the magnets depicted in FIGS. 3B, 3C. A displacement of at least one of the magnets causes a change in the magnetic field detected by magnetic sensor 330. Magnetic sensor 330 is configured to detect a change of the magnetic field in the x-axis direction, the y-axis direction, and the z-axis direction.

Figure 3E:
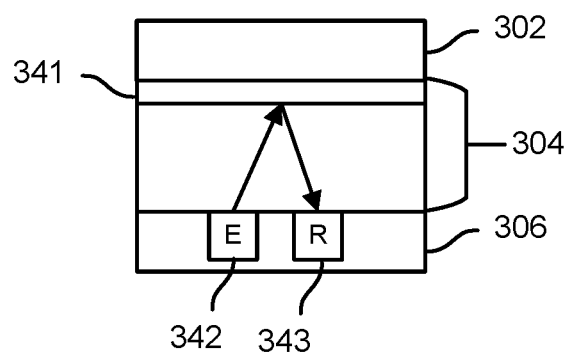
FIG. 3E is a diagram illustrating a tactile sensing unit in accordance with some embodiments.

FIG. 3E is a diagram illustrating a tactile sensing unit in accordance with some embodiments. Tactile sensing unit 340 may be implemented as a tactile sensing unit, such as tactile sensing unit 211, 213. In the example shown, a reflective material 341 is embedded in deformation layer 304. Emitter 342 (e.g., light emitting diode emitter) and receiver 343 are located on substrate layer 306. Emitter 342 may transmit a signal that is reflected off reflective material 341 and the reflected signal is received at receiver 343. A reference amplitude of the signal received at receiver 343 may be determined when a robotic arm end effector is not engaged with an item. When the robotic arm end effector engages an item, a force and/or moment associated with the engagement changes how the signal travels through deformation layer 304. For example, the amplitude of the signal received at receiver 343 may increase or decrease due to reflection, refraction, and/or dispersion of the signal within deformation layer 304. A processor may be coupled to the receiver and compare the reference signal amplitude to the received signal amplitude to determine a weight value and/or a deformation value.

When the robotic end effector successfully grasps an item, the successful grasp may be associated with a signal amplitude. Receiver 343 may receive the current signal while the robotic arm end effector is moving the item from the first location to the second location and a processor may use the current signal amplitude to determine whether the item is starting to slip and/or is slipping from the robotic arm end effector's grasp. The processor may monitor the current signal amplitude, the current weight value, and/or the current deformation values for any changes. A change in the current signal amplitude from the signal amplitude associated with a successful grasp, the current weight value from a weight associated with a successful grasp, and/or a current deformation value from a deformation value associated with a successful grasp that exceeds a corresponding first threshold may indicate that the item is starting to slip from the robotic arm end effector's grasp. A change in the current signal amplitude from the signal amplitude associated with a successful grasp, the current weight value from a weight associated with a successful grasp, and/or a current deformation value from a deformation value associated with a successful grasp that exceeds a corresponding second threshold may indicate that the item is slipping from the robotic arm end effector's grasp.

Figure 3F:
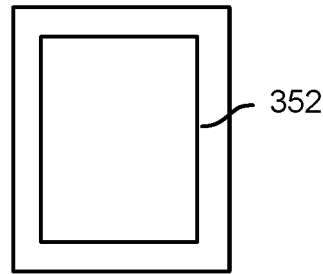
FIG. 3F is a diagram illustrating a tactile sensing unit in accordance with some embodiments.
Figure 3F:
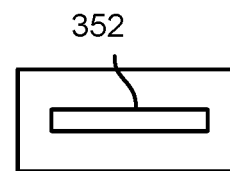

FIG. 3F is a diagram illustrating a tactile sensing unit in accordance with some embodiments. Tactile sensing unit 350 may be implemented as a tactile sensing unit, such as tactile sensing unit 211, 213. In the example shown, a conductive layer and a substrate layer of the tactile sensing unit are not shown for explanation purposes.

Tactile sensing unit 350 includes an electro-mechanical sensor 352 capable of detecting deformation (e.g., strain gauge) are embedded in the dielectric material. A reference sensed resistance associated with electro-mechanical sensor 352 may be determined when a robotic arm end effector is not engaged with an item. When the robotic arm end effector engages an item, a force and/or moment associated with the engagement causes a resistance associated with electro-mechanical sensor 352 to change. A processor may be coupled to the one or more electro-mechanical sensors and compare the reference sensed resistance value to the changed resistance value to determine a weight value and/or a deformation value.

When the robotic end effector successfully grasps an item, the successful grasp may be associated with a resistance value. While the robotic arm end effector is moving the item from the first location to the second location, a processor may use a current resistance value to determine whether the item is starting to slip and/or is slipping from the robotic arm end effector's grasp. The processor may monitor the current resistance value, the current weight value, and/or the current deformation values for any changes. A change in the current resistance value from the resistance value associated with a successful grasp, the current weight value from a weight associated with a successful grasp, and/or a current deformation value from a deformation value associated with a successful grasp that exceeds a corresponding first threshold may indicate that the item is starting to slip from the robotic arm end effector's grasp. A change in the current resistance value from the resistance value associated with a successful grasp, the current weight value from a weight associated with a successful grasp, and/or a current deformation value from a deformation value associated with a successful grasp that exceeds a corresponding second threshold may indicate that the item is slipping from the robotic arm end effector's grasp.

Figure 3G:
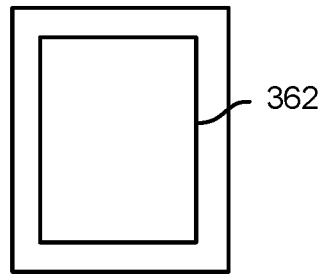
FIG. 3G is a diagram illustrating a tactile sensing unit in accordance with some embodiments.
Figure 3G:
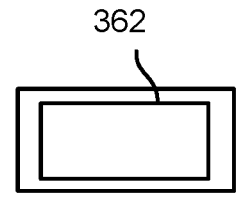

FIG. 3G is a diagram illustrating a tactile sensing unit in accordance with some embodiments. Tactile sensing unit 360 may be implemented as a tactile sensing unit, such as tactile sensing unit 211, 213. In the example shown, a conductive layer and a substrate layer of the tactile sensing unit are not shown for explanation purposes.

The deformation layer of tactile sensing unit 360 includes a flexible membrane 362 (e.g., sac, pouch) that contains air, a gas, or liquid. A reference pressure associated with flexible membrane 362 may be determined when a robotic arm end effector is not engaged with an item. When the robotic arm end effector engages an item, a force and/or moment associated with the engagement causes a pressure associated with flexible membrane 362 to change. A processor may be coupled to the flexible membrane and compare the reference pressure value to the changed pressure value to determine a weight value and/or a deformation value.

When the robotic end effector successfully grasps an item, the successful grasp may be associated with a pressure value. While the robotic arm end effector is moving the item from the first location to the second location, a processor may use a current pressure value to determine whether the item is starting to slip and/or is slipping from the robotic arm end effector's grasp. The processor may monitor the current pressure value, the current weight value, and/or the current deformation values for any changes. A change in the current pressure value from the pressure value associated with a successful grasp, the current weight value from a weight associated with a successful grasp, and/or a current deformation value from a deformation value associated with a successful grasp that exceeds a corresponding first threshold may indicate that the item is starting to slip from the robotic arm end effector's grasp. A change in the current pressure value from the pressure value associated with a successful grasp, the current weight value from a weight associated with a successful grasp, and/or a current deformation value from a deformation value associated with a successful grasp that exceeds a corresponding second threshold may indicate that the item is slipping from the robotic arm end effector's grasp.

Figure 4:
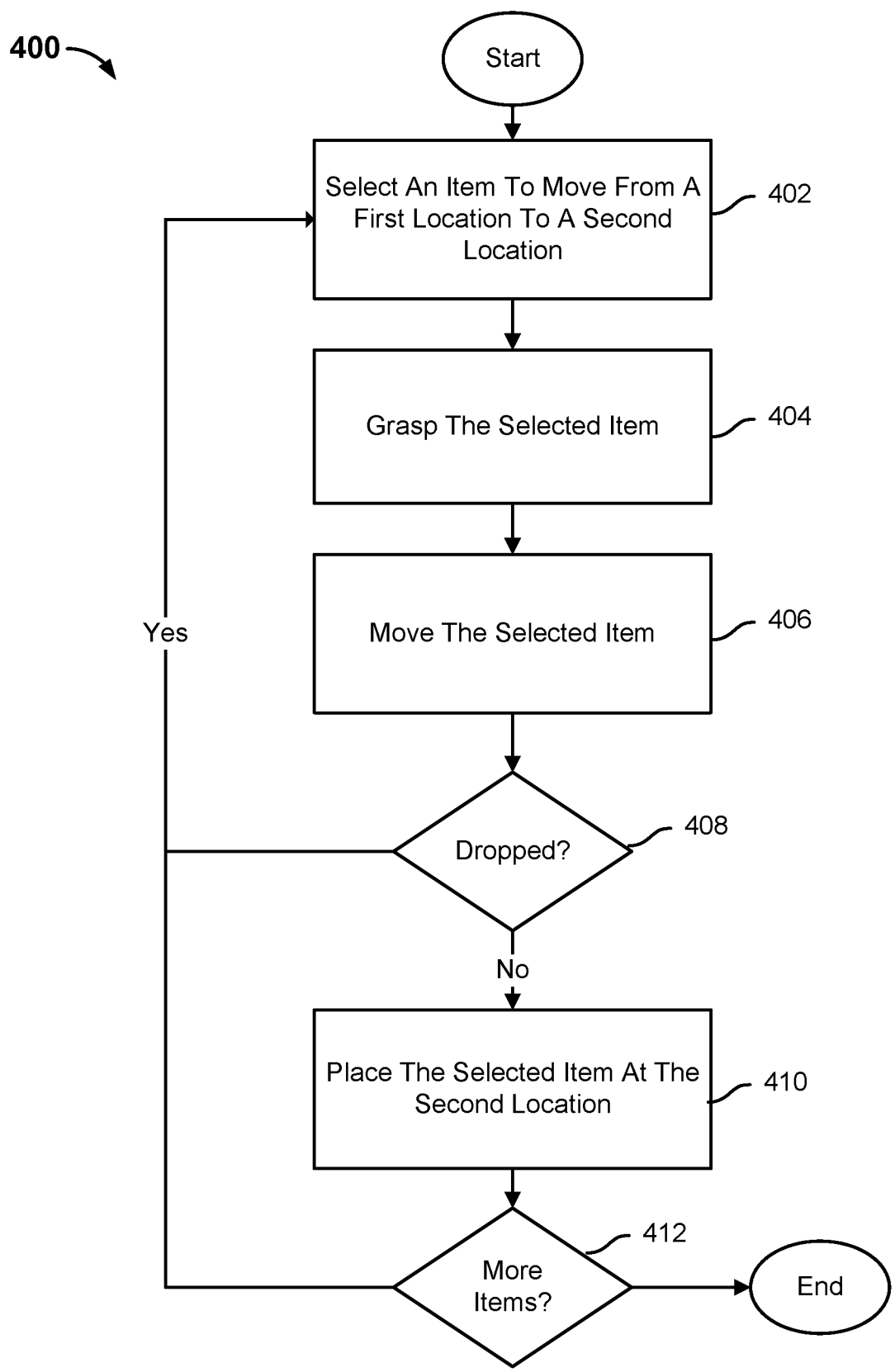
FIG. 4 is a flow chart illustrating a process for picking and placing an item in accordance with some embodiments.

FIG. 4 is a flow chart illustrating a process for picking and placing an item in accordance with some embodiments. In the example shown, process 400 may be implemented by a robotic system, such as robotic system 101.

At 402, an item is selected to be moved from a first location to a second location. A first location, such as a workspace area, may include one or more items. A robotic environment may include a plurality of cameras that are configured to view and detect the one or more items from different vantage points. In some embodiments, one or more of the cameras generate one or more point clouds of the one or more items. In the event a plurality of point clouds are generated, the plurality of point clouds are merged together. In various embodiments, the one or more items may include a plurality of items placed in a cluttered pile, a plurality of items that are spaced apart, and/or a plurality of items one or more of which is obscured from view by one or more other items of the plurality of items.

Geometry information is determined for each of the plurality of items. Geometry information may be determined based on point cloud information obtained from data associated with one or more of the plurality of cameras. Corresponding geometry information associated with each of the plurality of features may be compared to a library of geometries for which grasp strategies are known. A strategy associated with a geometry that most closely resembles the geometry of a determined feature, e.g., within a similarity threshold, may be selected. In some embodiments, an item is associated with a single feature (e.g., a roll of paper towel corresponds to a cylinder). In some embodiments, an item is split into a plurality of sub-segments (also referred to as sub-objects herein) and corresponding features for each of the plurality of sub-segments are determined (e.g., a golf club includes a body segment and a head segment).

Items that are near edges of a workspace area or corners may have physical or other limitations about where and/or how the item is to be picked. In some embodiments, a non-optimal, but feasible pick angle may be selected depending on the environment boundaries associated with an item. A wider longitudinal may be selected over a narrower latitudinal grasp because the wider longitudinal grasp may keep the end effector within the environmental bounds.

Corresponding scores of a successful grasp are determined for each of the determined grasp strategies. For example, a gripping tool, such as end effector 200, may be used to grasp an object at a top portion, middle portion, or bottom portion of an item. A score of a successful grasp of a feature may be based on a probability that the grasping strategy will result in a successful grasp. Probabilities are determined for the different combinations of gripping tools (in embodiments where multiple tools are available) and grasping locations. The probability that the grasping strategy will result in a successful grasp of the item may be based on one more grasping modalities, such as contextual information about the environment, historical grasp information for the environment, an angle at which a robotic arm is to grasp the item (to avoid collision with other items), a height at which a robotic arm is to grasp the item (to prevent collision at the top of the gripper), grip width, orientation of surface normal at grasp points, the amount of the item that is capable of being grasped, etc. Contextual information about the environment includes the existence of other items near or adjacent to the item, the amount that the other items near or adjacent to the item hinder an ability of a robotic arm to grasp the item, whether more items are continuously being added to a workspace area, etc.

One of the determined grasp strategies is selected to be attempted based on the determined corresponding scores. The items or features, and corresponding grasping strategies are ranked based on the corresponding scores. The item or feature with the highest score among the plurality of items and features is selected to be grasped. In the event a plurality of potential grasps have the same score, one of the plurality of grasps is selected. After the grasped object has been moved, one of the other grasps having the same score is selected.

In the event an item from the plurality of items has been selected, grasped, moved, and placed in a drop off area, the grasp with the next highest score is selected to be attempted.

At 404, the selected item is grasped. An end effector of the robotic system engages the selected item. The end effector may include a plurality of fingers. Each of the plurality of fingers may be associated with a corresponding tactile sensing unit. The tactile sensing unit may include a plurality of sensing layers. Each of the sensing layers may include one or more sensors. When engaged with an item, each of the sensing layers of the tactile sensing unit may output a corresponding sensed value that is different from a reference sensed value (e.g., when the robotic arm end effector is not engaged with an item).

The robotic system performs a static measurement using a plurality of sensors to determine whether the robotic arm end effector successfully grasped an item. The static measurement may include the robotic arm end effector grasping the item at rest and measuring the outputs of the plurality of sensors. The robotic system may also perform a dynamic measurement using the plurality of sensors to determine whether the robotic arm end effector successfully grasped the item. For example, after an initial grasp, an orientation of the robotic arm end effector may modified and the output of the plurality of sensors may be measured while the robotic arm end effector is moving to determine whether the robotic arm end effector successfully grasped the item.

The one or more tactile sensing units are coupled to a processor. The processor may use the sensor outputs to determine one or more forces and/or one or more moments associated with an engagement between the robotic arm end effector and an item. The sensor outputs (tactile sensing unit sensor(s) and/or housing sensor(s)) may be used to determine corresponding values for the plurality of modalities. For example, a sensed weight, a sensed amount of deformation, a sensed continuity, a sensed conductivity, a sensed pressure, a sensed resistance, a sensed inductance, and/or a sensed capacitance may be determined.

The plurality of modalities are each associated with a coefficient. In some embodiments, the plurality of modalities are weighted equally (e.g., they each have an associated coefficient of "1"). In some embodiments, some of the plurality of modalities have different weights. For example, the selected item may be a metal object and the coefficient associated with a continuity factor may be less than the coefficient associated with a deformation factor.

The processor may implement a multi-modal model to determine whether the robotic arm end effector grasped an item. The multi-modal model may be a rule-based model, a predictive model, a machine learning model machine learning model, etc. In some embodiments, the multi-modal model is configured to output a binary decision regarding whether the robotic arm end effector is engaged with an item (e.g., engaged/non engaged. In some embodiments, the multi-modal model is configured to output a probability of whether the robotic arm end effector is engaged with the item. Some or all of the corresponding values associated with the plurality of modalities and their corresponding coefficients are provided as input to the multi-modal model and the robotic system is configured to perform a responsive action based on an output of the multi-modal model.

The robotic system may be trained to apply force to a grasped item. The robotic system may apply a range of forces to items of different shapes, sizes, types, and weights to learn a "ground truth." A range of forces may be applied to different grasp locations of an item. A range of forces may be applied for different grasp techniques. The robotic system may learn an amount of force that will result in a successful grasp for a particular item. The robotic system may also learn an amount of force that will result in a particular item slipping from a grasp of a robotic arm end effector.

At 406, the selected item is moved. The selected item is moved in response an output of the multi-modal model indicating that the end effector grasped the selected item. A processor may determine whether the selected item is starting to slip or is slipping while the selected item is being moved. The processor may use current outputs from one or more tactile sensing units to make the determination. Current values for a plurality of modalities (e.g., weight, deformation, continuity, conductivity, pressure, resistance, inductance, capacitance or any other factor that is indicative of robotic arm end effector engagement) may be determined based on the outputs from the one or more tactile sensing units. The current values associated with the plurality of modalities and their corresponding coefficients are provided as input to the multi-modal model. In some embodiments, the current outputs form the one or more tactile sensing units are also provided as input to the multi-modal model. The input is applied to the multi-modal model and the robotic system is configured to determine whether the selected item is starting to slip or is slipping while the selected item is being moved based on an output of the multi-modal model.

At 408, it is determined whether or not the object associated with the selected grasp has been dropped while moving the object from the workspace area to the drop off area. The object may be determined to have been dropped based one or more sensor measurements (e.g., pressure, force, capacitance, etc.) of the one or more tactile sensor units associated with the end effector of the robotic system. A sensor measurement may be compared to a corresponding threshold value to determine whether the object has been dropped. In the event the item has been dropped, process 400 returns to 402. In the event the item has not been dropped, process 400 proceeds to 410.

At 410, the selected item is placed at the second location. Items may be placed in a manner that prevents the end effector from colliding with boundaries associated with the second location.

In some embodiments, the item is placed in a clutter with other items at the second location. The robotic system may randomly place the item at the second location. The robotic system may then use a force sensor on the end effector to gently place the item on the clutter without causing the robotic system to perform a protective stop. The robotic system may tightly pack items into boxes at the second location by using the force sensor to realize a tight slotting strategy.

In some embodiments, the item is placed spaced apart from other items at the second location. The robotic system may divide a placement space at the second location into a plurality of subareas and place the selected item in one of the subareas. There may be a buffer area between each of the subareas. In some embodiments, the buffer area is adjustable.

In some embodiments, a vision system associated with the robotic system is configured to determine how to place the item down. For example, some items are not rigid and the extents associated with an item (e.g., a cloth or a cuddly toy) change after the item has been grasped and moved. The vision system is configured to determine what the extents are and the material information to choose how to place the item down to prevent crushing it and from dropping it from a height that might damage the item or cause the object to fall into a tangled or unfavorable configuration.

At 412, it is determined whether there are more items to be moved. Visual data from one or more cameras of the robotic system may be used to determine whether there are more items to be moved. In the event there are more items to be moved, process 400 returns to 402. In the event there are no more items to be moved, process 400 ends.

Figure 5:
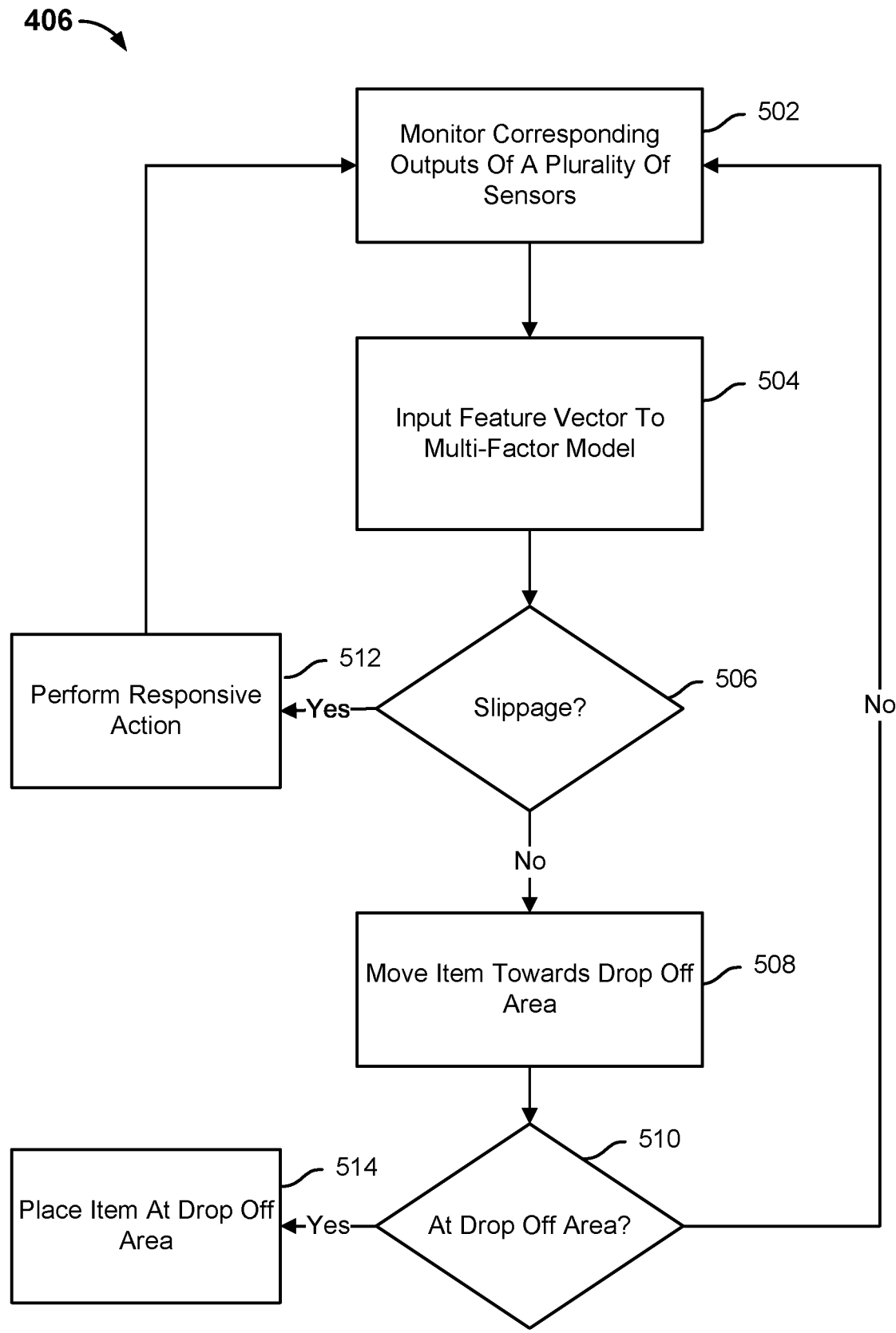
FIG. 5 flow chart illustrating a process for detecting slippage in accordance with some embodiments.

FIG. 5 flow chart illustrating a process for detecting slippage in accordance with some embodiments. In some embodiments, process 500 is implemented by a robotic system, such as robotic system 101. In some embodiments, process 500 is implemented to perform some or all of step 406 of process 400.

At 502, corresponding outputs of a plurality of sensors are monitored. A robotic system includes a robotic arm end effector and one or more tactile sensor units associated with the fingers of the robotic arm end effector. The robotic arm end effector may include a wrist portion that includes one or more sensors. A tactile sensing unit includes one or more sensors as described herein.

When the robotic arm end effector grasps an item, each of the plurality of sensors output corresponding values. A processor may determine corresponding values for a plurality of modalities based on the sensor values. For example, the processor may determine a weight value, a deformation value, a continuity value, a conductivity value, a pressure value, a resistance value, an inductance value, a capacitance value, etc.

The sensed values may fluctuate while the robotic arm end effector is grasping an item. The processor may monitor the sensed values over time while the robotic arm end effector is moving the item from the first location to the second location to determine whether the item is starting to slip and/or is slipping from the grasp of the robotic arm end effector.

In some embodiments, one or more sensed values associated with the robotic arm end effector indicates linear slippage associated with an item being grasped by the robotic arm end effector. In some embodiments, one or more sensed values associated with the robotic arm end effector indicates rotational slippage associated with an item being grasped by the robotic arm end effector.

At 504, a feature vector is inputted into a multi-modal model. The elements of the feature vector may include one or more sensed values and/or one or more modality values determined based on the one or more sensed values. The multi-modal model may be a rule-based model, a predictive model, a machine learning model (e.g., neural network, linear classifier, support vector machine, linear regression, logistic regression, decision tree, deep learning, etc.), etc.

In some embodiments, the processor compares the one or more sensed values and/or or the one or more determined modality values to one or more corresponding first thresholds to determine whether the item is starting to slip from the grasp of the robotic arm end effector. In some embodiments, the processor compares the one or more sensed values and/or or the one or more determined modality values to one or more corresponding second thresholds to determine whether the item is slipping from the grasp of the robotic arm end effector.

In some embodiments, the processor classifies the sensed values based on a combination of the element values of the modality value. The feature vector may have a location in a feature space based on the element values of the modality value. The processor may classify the feature vector as being indicative of no item slippage, item starting to slip, and/or slipping item based on a location of the feature vector in the feature space.

The multi-modal model may be trained to classify whether a slippage associated with an item is linear or rotational. For example, the robotic arm end effector may grasp an item a plurality of times and allow the item to have linear slippage so that a range associated with sensed values indicative of linear slippage may be determined. A range for one or more of the modality values determined based on the sensed values indicative of linear slippage may also be determined. This process may be repeated for items having different shapes, sizes, features, and weights. This process may also be repeated at different grasp locations of an item. This process may also be repeated for different grasp techniques.

The robotic arm end effector may grasp an item a plurality of times and allow the item to have rotational slippage so that a range associated with sensed values indicative of rotational slippage may be determined. A range for one or more of the modality values determined based on the sensed values indicative of rotational slippage may also be determined. This process may be repeated for items having different shapes, sizes, features, and weights. This process may also be repeated at different grasp locations of an item. This process may also be repeated for different grasp techniques.

At 506, it is determined whether the grasped item is starting to slip from a grasp of the robotic arm end effector or is slipping from the grasp of the robotic arm end effector. In some embodiments, the multi-modal model is configured to output a binary decision regarding whether the item is starting to slip from the grasp of the robotic arm end effector. In some embodiments, the multi-modal model is configured to output a binary decision regarding whether the item is slipping from the grasp of the robotic arm end effector. In some embodiments, the multi-modal model is configured to output a probability of whether the item is starting to slip from a grasp of the robotic arm end effector. In some embodiments, the multi-modal model is configured to output a probability of whether the item is slipping from a grasp of the robotic arm end effector.

In the event the output of the multi-modal model indicates the item is starting to slip from a grasp of the robotic arm end effector or is slipping from the grasp of the robotic arm end effector, process 500 proceeds to 512. In the event the output of the multi-modal model does not indicate the item is starting to slip from a grasp of the robotic arm end effector or is slipping from the grasp of the robotic arm end effector, process 500 proceeds to 508 where the item is moved towards a drop off area. At 510, it is determined whether the robotic arm end effector is located at the drop off area. In the event the robotic arm end effector is not located at the drop off area, process 500 returns to 502. In the event the robotic arm end effector is located at the drop off area, process 500 proceeds to 514 and the item is placed at the drop off area.

At 512, the robotic system performs one or more responsive actions. In some embodiments, the end effector places the item at a safe location and re-grasps the item. In some embodiments, a speed at which the robotic arm moves the item is reduced.

In some embodiments, the robotic arm adjusts an orientation of the end effector to prevent or reduce slippage. For example, the end effector may grasp an item on the sides of the item (e.g., left side and right side). The robotic arm may just adjust the orientation of the end effector by 90 degrees such that the end effector is grasping the item on the "top" side and "bottom" side of the item. This may reduce the influence that gravity is causing the item to slip from the grasp of the end effector.

In some embodiments, the end effector applies additional grasping force. The amount of additional applied force may depend on a fragility associated with the grasped item (e.g. the amount of additional force that may be applied without breaking the item). The fragility of the grasped item may be determined based on determined deformation values when the end effector grasps the item. The determined deformation values may indicate whether the grasped item is fragile or not fragile. In some embodiments, output from camera(s) and/or sensor(s) associated with the robotic system, such as weight sensors, may indicate a type of item being grasped (e.g., cardboard box, plush toy, glass cup, etc.) and the amount of additional applied force may depend based on the item type. In some embodiments, the amount of additional applied force depends on whether linear slippage or rotational slippage is determined to be occurring. In some embodiments, the amount of additional applied force may depend on a material associated with the grasped item. The material associated with the grasped item may be determined based on a sensed capacitance associated with the sensed item.

The robotic system may be trained to apply additional force to a grasped item when the grasped item is starting to slip and/or is slipping from the grasp of the end effector. A range of forces may be applied to items of different shapes, sizes, types, and weights. A range of forces may be applied to different grasp locations of an item. A range of forces may be applied for different grasp techniques. The robotic system may learn a threshold amount of force that will not cause a particular grasped item to be damaged when additional force is applied.

In various embodiments, the robotic system is configured to learn, e.g., via machine learning techniques, how much additional force is required to be applied to a grasped item if the item starts to slip or slips from the grasp of the end effector. The robotic system may further be configured to learn whether the additional force damaged or did not damage the item. Feedback that indicates whether the robotic system damaged or did not damage the item may be provided to the robotic system. The feedback may be provided by a human operator or determined after the robotic system has placed the item at the drop off location.

In some embodiments, techniques disclosed herein may be used by the system to learn and use strategies to grasp and/or move an item from a source location to a destination location, including by using controlled slippage, i.e., allowing the item to slip within and while remaining in the grasp of the end effector, such as to reposition and/or reorient the item by allowing it to slip within the end effector. For example, an item may be allowed to slip down within the grasp of the end effector, e.g., to increase stability or move some of the mass and/or volume of the item to a position below the end effector. In another example, controlled slippage may be used to allow an item grasped some distance from the center of gravity, such as at one end of an item having an elongated shape, to rotate about an axis through which it has been grasped, so as to change the orientation of the item within the end effector's grasp. In various embodiments, such maneuvers may be included in a set of grasp strategies available to be used to grasp the item and move it to a destination. The robot may use such a strategy to grasp an item at an end sticking out from a pile of other items, for example, and use a controlled slippage maneuver to reposition or reorient the item to a position that is more stable and/or more likely to ensure the item does not contact an obstacle located along a trajectory that the robot has planned to move the item from the source location to the destination location.

Figure 6A:
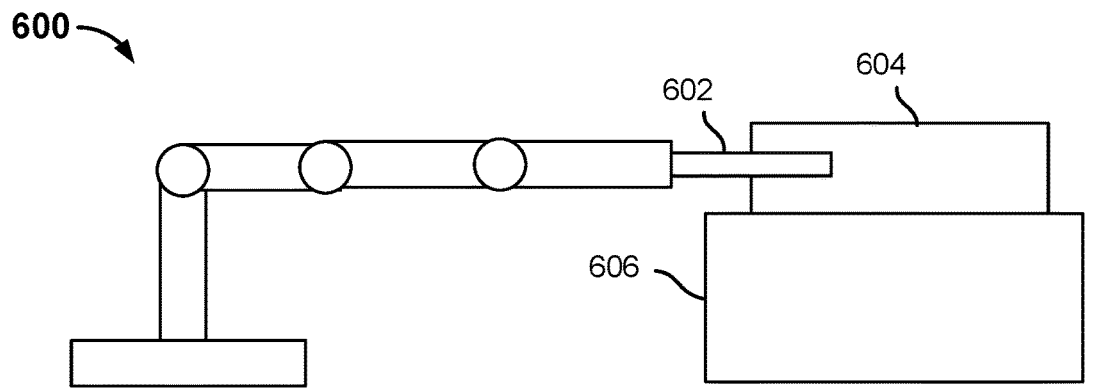
FIGS. 6A-6C are diagrams illustrating an example of a pick and place operation that includes controlled slippage.
Figure 6B:
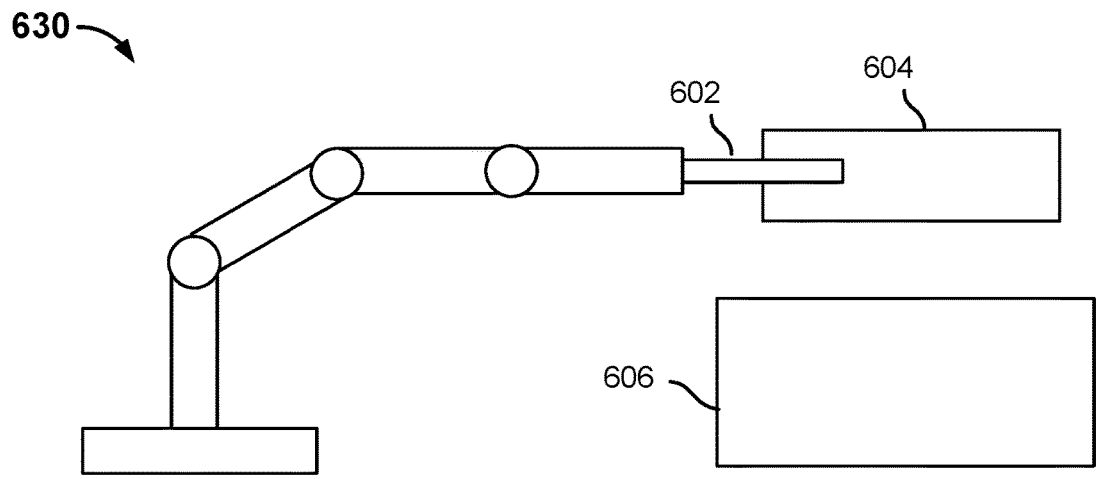
Figure 6C:
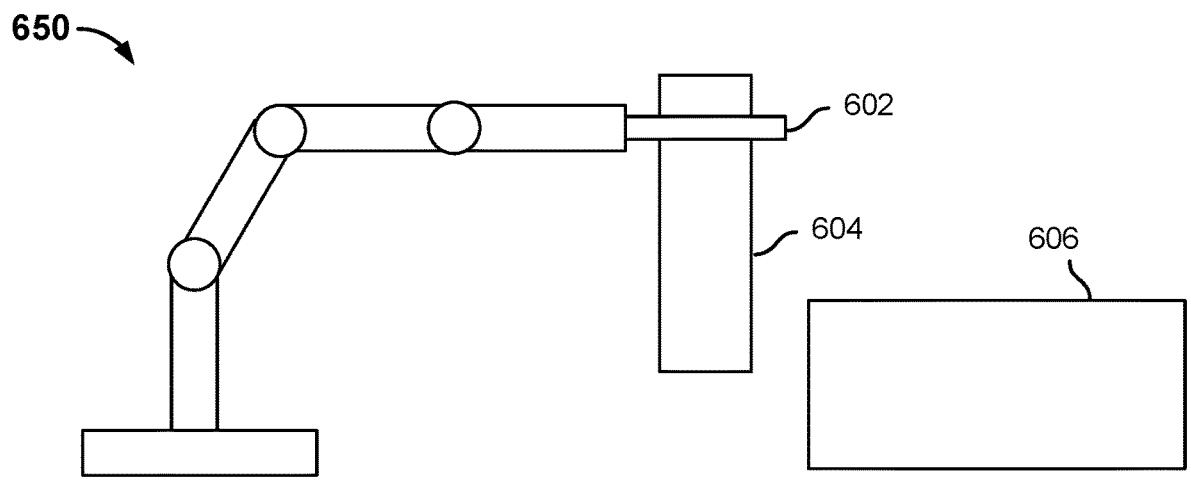

FIGS. 6A-6C are diagrams illustrating an example of a pick and place operation that includes controlled slippage. FIG. 6A depicts an environment 600 that includes a robotic system with an end effector 602 grasping an item 604. Item 604 is located on top of item 606. Environment 600 may include one or more cameras (not shown) that allow the robotic system to determine approximate dimensions for items 604, 606.

A processor of the robotic system determines one or more grasp strategies for item 604. The one or more grasp strategies may include grasping item 604 from the sides of item 604 or from the top of item 604. The processor may determine that end effector 602 is unable to grasp item 604 from the top of item 602 due to physical limitations of the robotic system (e.g., the robotic arm is unable to position itself such that end effector 602 is able to grasp item 604 from the top of item 604). The processor of the robotic system may select a grasp strategy that includes end effector 602 grasping item 604 from the sides of item 604.

FIG. 6B depicts an environment 630 in which the robotic arm of the robotic system has lifted item 604 from item 606. End effector 602 includes one or more tactile sensing units (not shown). The robotic system determines one or more forces and/or one or more moments being applied to end effector 602 while end effector 602 is grasping item 604. The robotic system may determine a current weight distribution of item 604 based on the one or more determined forces and/or one or more determined moments. The robotic system may determine to perform a controlled slip of item 604 to change an orientation of item 604 with respect to end effector 602 such that end effector 602 uses less force to grasp item 604. For example, the current weight distribution of item 604 may cause the robotic system to drop item 604. In some embodiments, robotic system may determine to change the orientation of item 604 as part of a grasping strategy before item 604 is grasped. In some embodiments, the robotic system may determine to change the orientation of item 604 while item 604 is being grasped by end effector 602.

FIG. 6C depicts an environment 650 in which the robotic arm of the robotic system has moved item 604 to an intermediate position. At the intermediate position, in the example shown, the robotic system has completed a controlled-slippage maneuver to reposition the item 604 in the orientation shown. The maneuver included, in this example, adjusting the force applied by end effector 602 to item 604 such that gravity caused the item 604 to rotate from a horizontal position to a vertical position as shown, without slipping out of the grasp of end effector 602. The maneuver may have been planned and executed, for example, to enable the robotic system to move item 604 through a restricted space and/or use less force to hold item 604. The robotic system may move item 604 to a drop-off area after the orientation of item 604 has been modified.

Figure 7:
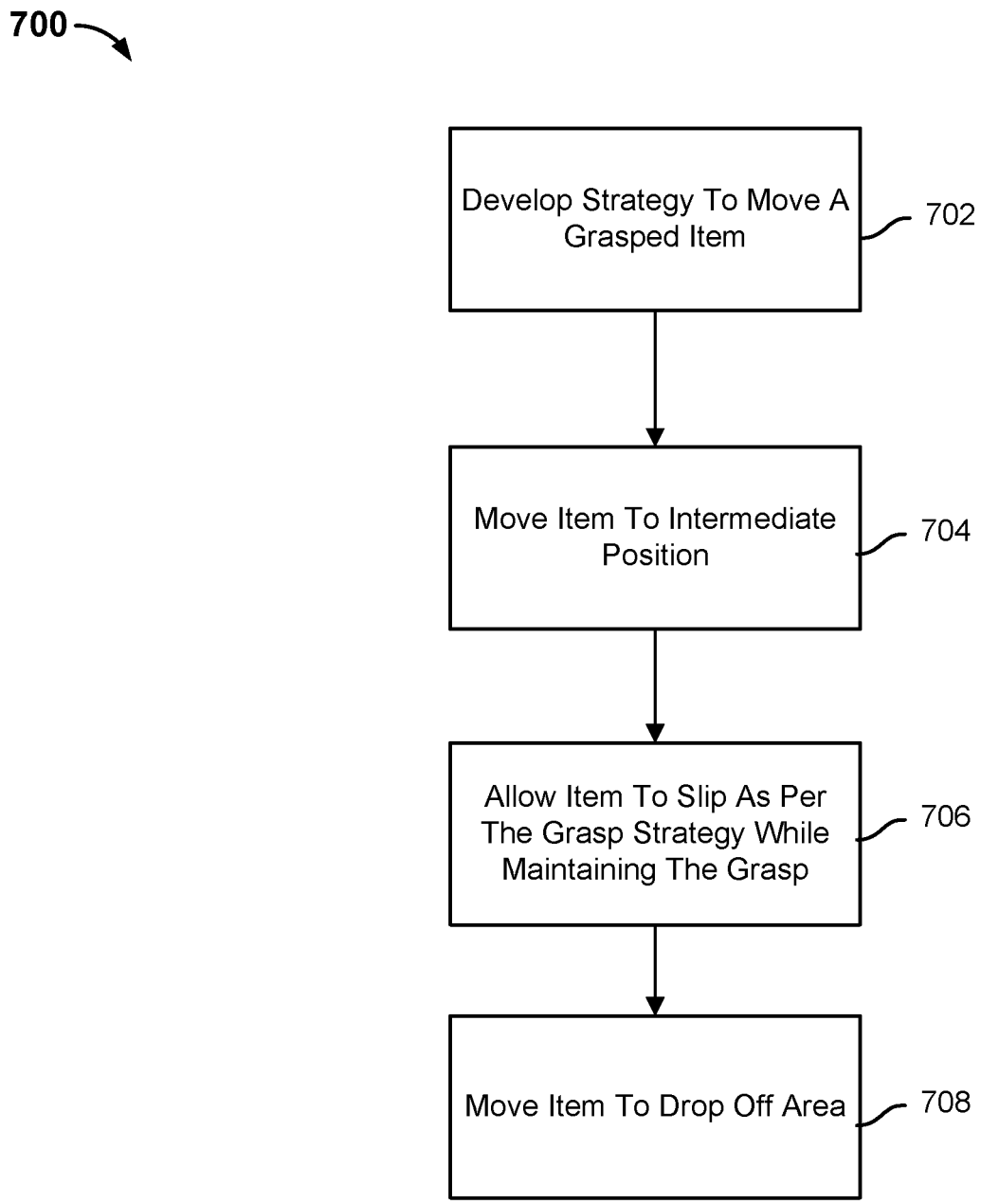
FIG. 7 is a flow chart illustrating a process for grasping an item in accordance with some embodiments.

FIG. 7 is a flow chart illustrating a process for grasping an item in accordance with some embodiments. In some embodiments, process 700 is implemented by a robotic system, such as robotic system 101. In some embodiments, process 700 is implemented to perform some or all of steps 404/406 of process 400.

At 702, a strategy to move a grasped item is developed. A robotic system uses sensed values from the tactile sensing unit(s) and a multi-modal model to determine and implement a strategy to reorient and/or otherwise reposition an item in the grasp of the end effector. In some embodiments, the item is located in a cluttered pile. In some embodiments, an orientation or position of the grasped item prevents a robotic arm from moving the grasped item without accidentally touching other items of the cluttered pile. In some embodiments, the required grip force is too strong to pick up an object with an orientation in which a center of mass of the object is far from the grasped contact points on the object. A strategy to move the grasped item may include performing an initial grasp of the item and then re-adjusting the grasp of the item after the item has been moved a threshold distance away from the other items.

At 704, the item is moved to an intermediate location. The intermediate location may be a threshold distance away from other items of the cluttered pile. The intermediate location may be determined based on the dimensions associated with the grasped item and other detected items.

At 708, the item is allowed to slip as per the grasp strategy while maintaining a grasp of the item. The robotic system intentionally eases its grip on the item to a point at which the item begins to slip in an expected and intended manner, such as by sliding in a downward direction, between the fingers or other engagement structures of the end effector, or by rotating while still in the grasp of the end effector. Once the item is in a desired position and/or orientation, more force is applied as needed to halt and prevent further slippage.

At 710, the item is moved to a drop off area.

Figure 8:
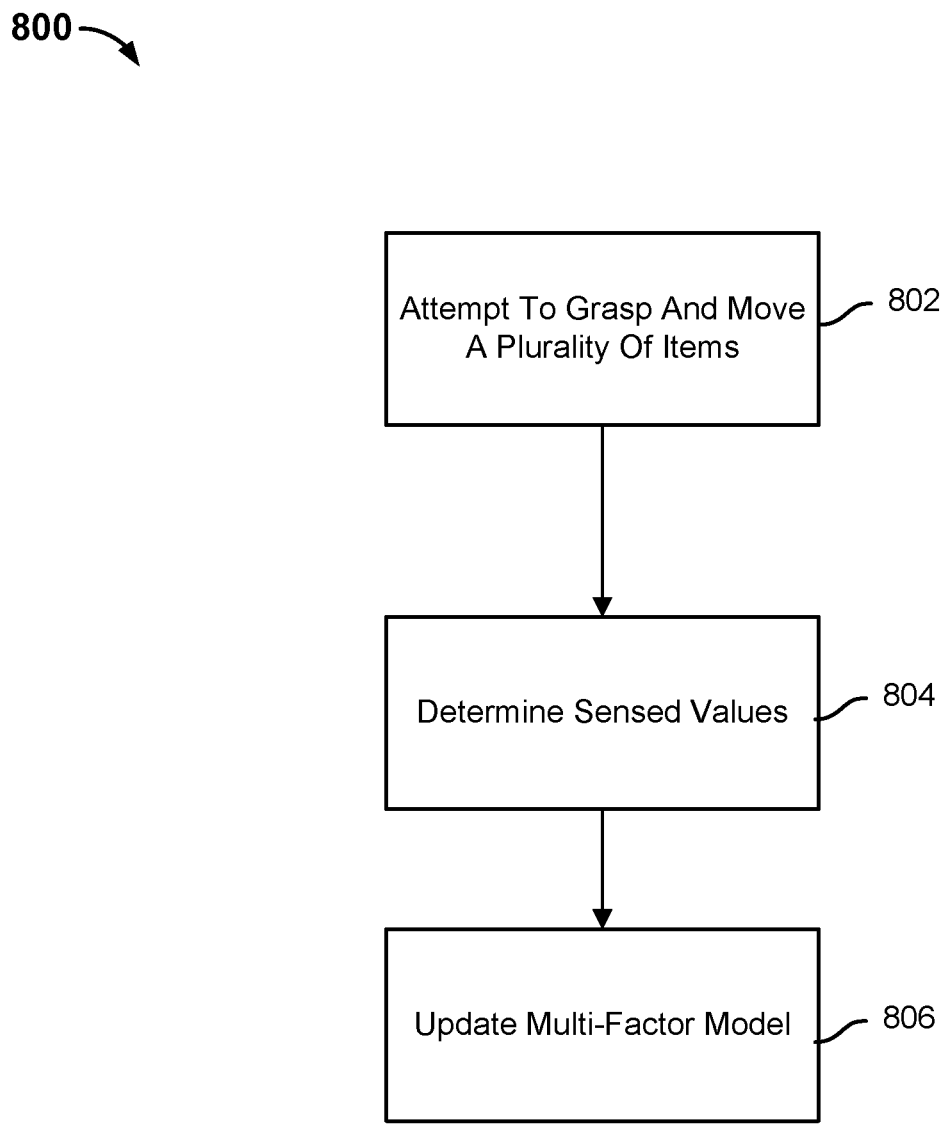
FIG. 8 is a flow chart illustrating a process for training a multi-modal model.

FIG. 8 is a flow chart illustrating a process for training a multi-modal model. In some embodiments, process 800 is implemented by a robotic system, such as robotic system 101.

At 802, a plurality of items are attempted to be grasped and moved. The robotic system may apply a range of forces to items of different shapes, sizes, types, and weights to learn a "ground truth." A range of forces may be applied to different grasp locations for a plurality of different items. A range of forces may be applied for different grasp techniques.

The robotic system may include a ground truth sensor. For example, the robotic system may use a motion capture system to track each object to determine the range of force combined with different grasp locations that can result in the desired pick and place behavior. A wrist force sensor can be used to measure if the item was successfully picked up after each pick. Accelerometers and/or gyroscopes may be placed on items that enable the robotic system to determine whether the grasped item is slipping. The robotic system may learn whether a grasped item slipped or did not slip based on an output of the accelerometers and/or gyroscopes. The robotic system may learn whether a grasp was successful or unsuccessful.

At 804, sensed values are determined. An end effector may include a plurality of sensors. Each of the sensors outputs a sensed value when an item is grasped and moved to a drop-off location. The robotic system may learn an amount of force that will result in a successful grasp or unsuccessful for a particular item, i.e., the robotic system is able to lift the grasp item from its initial position. The robotic system may use the sensed outputs to determine one or more modalities.

As the robotic system moves the grasped item to a different location, the robotic system may also learn whether the amount of applied force resulted in the grasped item slipping or not slipping from a grasp of a robotic arm end effector. The robotic system may determine whether the grasped item is slipping or not slipping based on the sensed output from the plurality of sensors and/or the one or more determined modalities.

In some embodiments, the system may learn to apply a greater force and/or to tolerate more slippage when the item is first being grasped and pulled from a pile or other source of items, e.g., to enable the item to be pulled free of overlapping items to be moved to a destination. In some embodiments, the item is moved in a manner determined at least in part to minimize slippage and/or avoid having the item slip fully from the robot's grasp.

At 806, a multi-modal model is updated. The robotic system may associate a successful grasp or unsuccessful grasp with the sensed values and/or one or more modalities determined based on the sensed values. Profiles of successful and unsuccessful grasps are generated and saved by the robotic system. This allows the robotic system to compare current sensed values and/or current factor value(s) with previous sensed value(s) and/or factor value(s) to determine whether a current grasp will be successful (item moved to drop-off location without dropping) or unsuccessful (item slipped/dropped before item moved to drop-off location).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A robotic system, comprising:
a tactile sensing unit that includes a plurality of sensors, each of the plurality of sensors configured to provide a corresponding output that reflects a sensed value associated with engagement of a robotic arm end effector with an item, wherein the tactile sensing unit includes a plurality of layers, wherein the tactile sensing unit is located on a digit of the robotic arm end effector, wherein a top layer of the plurality of layers is associated with a first modality indicative of the engagement of the robotic arm end effector with the item and an intermediate layer of the plurality of layers is associated with a second modality indicative of the engagement of the robotic arm end effector with the item, wherein the first modality indicative of the engagement of the robotic arm end effector with the item is different than the second modality indicative of the engagement of the robotic arm end effector with the item, wherein the intermediate layer of the plurality of layers includes a plurality of measurement objects that are embedded in a material associated with the intermediate layer and a layer below the intermediate layer includes a first sensor of the plurality of sensors, wherein the first sensor is configured to measure a value associated with the plurality of measurement objects that are embedded in the material associated with the intermediate layer; and
a processor coupled to the plurality of sensors and configured to:
use the respective outputs of one or more sensors comprising the plurality of sensors to determine inputs to a multi-modal model configured to provide, based at least in part on the one or more inputs, an output associated with slippage of the item within or from a grasp of the robotic arm end effector wherein the inputs are associated with the first modality and the second modality, wherein the one or more sensors include the first sensor;
make, based at least in part on an output of the multi-modal model, a determination associated with slippage of the item within or from the grasp of the robotic arm end effector; and
take a responsive action based at least in part on the determination associated with slippage of the item within or from the grasp of the robotic arm end effector.

2. The robotic system of claim 1, wherein each of the plurality of layers includes one or more sensors of the plurality of sensors.

3. The robotic system of claim 1, wherein modalities associated with the multi-modal model include weight, deformation, continuity, conductivity, resistance, inductance, and/or capacitance.

4. The robotic system of claim 1, wherein the output of the multi-modal model indicates that the item is starting to slip from the grasp of the robotic arm end effector.

5. The robotic system of claim 1, wherein the output of the multi-modal model indicates that the item is slipping from the grasp of the robotic arm end effector.

6. The robotic system of claim 1, wherein the processor is further configured to monitor the respective outputs of the one or more sensors while the end effector is moving the item from a first location to a second location.

7. The robotic system of claim 1, wherein a deformation value determined based on the respective outputs of at least the first sensor of the one or more sensors indicates whether the item is slipping from the grasp of the robotic arm end effector.

8. The robotic system of claim 1, wherein a deformation value determined based on the respective outputs of at least the first sensor of the one or more sensors indicates whether the item is starting to slip from the grasp of the robotic arm end effector.

9. The robotic system of claim 1, wherein the multi-modal model is configured to classify the slippage of the item as linear slippage.

10. The robotic system of claim 1, wherein the multi-modal model is configured to classify the slippage of the item as rotational slippage.

11. The robotic system of claim 1, wherein the responsive action includes moving the item from a first location to a second location.

12. The robotic system of claim 1, wherein the responsive action includes placing the item at a location and re-grasping the item.

13. The robotic system of claim 1, wherein the responsive action includes adjusting an orientation of the robotic arm end effector.

14. The robotic system of claim 1, wherein the responsive action includes increasing a force applied by the robotic arm end effector to the item.

15. The robotic system of claim 14, wherein the force applied by the robotic arm end effector is based on a fragility associated with the item.

16. The robotic system of claim 1, wherein the force applied by the robotic arm end effector is based on whether the output of the multi-modal model indicates the slippage of the item is linear slippage or rotational slippage.

17. The robotic system of claim 1, wherein the processor is further configured to use the respective outputs of one or more sensors to initiate slippage of the item within or from the grasp of the robotic arm end effector to adjust the grasp of the robotic arm end effector with respect to the item.

18. A method, comprising:
using corresponding outputs of one or more sensors comprising a plurality of sensors included in a tactile sensing unit to determine inputs to a multi-modal model configured to provide, based at least in part on the one or more inputs, an output associated with slippage of an item within or from a grasp of the robotic arm end effector wherein the tactile sensing unit is located on a digit of the robotic arm end effector, wherein the inputs are associated with a first modality indicative of engagement of the robotic arm end effector with the item and a second modality indicative of engagement of the robotic arm end effector with the item, wherein the first modality indicative of engagement of the robotic arm end effector with the item is different than the second modality indicative of engagement of the robotic arm end effector with the item, wherein each of the plurality of sensors included in the tactile sensing unit is configured to provide a corresponding output that reflects a sensed value associated with engagement of the robotic arm end effector with the item, wherein the tactile sensing unit includes a plurality of layers wherein a top layer of the plurality of layers is associated with the first modality indicative of the engagement of the robotic arm end effector with the item and an intermediate layer of the plurality of layers is associated with the second modality indicative of the engagement of the robotic arm end effector with the item, wherein the intermediate layer of the plurality of layers includes a plurality of measurement objects that are embedded in a material associated with the intermediate layer and a layer below the intermediate layer includes the first sensor, wherein the first sensor is configured to measure a value associated with the plurality of measurement objects that are embedded in the material associated with the intermediate layer, wherein the one or more sensors include the first sensor;

making, based at least in part on an output of the multi-modal model, a determination associated with slippage of the item within or from the grasp of the robotic arm end effector; and taking a responsive action based at least in part on the determination associated with slippage of the item within or from the grasp of the robotic arm end effector.

19. A computer program product embodied in a non-transitory computer readable medium and comprising computer instructions for:

using corresponding outputs of one or more sensors comprising a plurality of sensors included in a tactile sensing unit to determine inputs to a multi-modal model configured to provide, based at least in part on the one or more inputs, an output associated with slippage of an item within or from a grasp of the robotic arm end effector wherein the tactile sensing unit is located on a digit of the robotic arm end effector, wherein the inputs are associated with a first modality indicative of engagement of the robotic arm end effector with the item and a second modality indicative of engagement of the robotic arm end effector with the item, wherein the first modality indicative of engagement of the robotic arm end effector with the item is different than the second modality indicative of engagement of the robotic arm end effector with the item, wherein each of the plurality of sensors included in the tactile sensing unit is configured to provide a corresponding output that reflects a sensed value associated with engagement of the robotic arm end effector with the item, wherein the tactile sensing unit includes a plurality of layers wherein a top layer of the plurality of layers is associated with the first modality indicative of the engagement of the robotic arm end effector with the item and an intermediate layer of the plurality of layers is associated with the second modality indicative of the engagement of the robotic arm end effector with the item, wherein the intermediate layer of the plurality of layers includes a plurality of measurement objects that are embedded in a material associated with the intermediate layer and a layer below the intermediate layer includes the first sensor, wherein the first sensor is configured to measure a value associated with the plurality of measurement objects that are embedded in the material associated with the intermediate layer, wherein the one or more sensors include the first sensor;

making, based at least in part on an output of the multi-modal model, a determination associated with slippage of the item within or from the grasp of the robotic arm end effector; and taking a responsive action based at least in part on the determination associated with slippage of the item within or from the grasp of the robotic arm end effector.

* * * * *